May 11, 1954 W. W. PHARIS 2,678,355

AUTOMATIC TELEPHONE SYSTEM WITH DIGIT-SENDING REPEATER

Filed Jan. 20, 1950 11 Sheets-Sheet 1

INVENTOR.
WILLIAM W. PHARIS

BY Winfred T. Powell
ATTORNEY

INVENTOR.
WILLIAM W. PHARIS
BY
Winfred T. Powell
ATTORNEY

INVENTOR.
WILLIAM W. PHARIS
BY
Winfred T. Powell
ATTORNEY

AUTOMATIC TELEPHONE SYSTEM WITH DIGIT-SENDING REPEATER

Filed Jan. 20, 1950 11 Sheets-Sheet 4

INVENTOR.
WILLIAM W. PHARIS

BY Winfred T. Powell
ATTORNEY

May 11, 1954 W. W. PHARIS 2,678,355

AUTOMATIC TELEPHONE SYSTEM WITH DIGIT-SENDING REPEATER

Filed Jan. 20, 1950 11 Sheets-Sheet 5

INVENTOR.
WILLIAM W. PHARIS
BY Winfred T. Powell
ATTORNEY

AUTOMATIC TELEPHONE SYSTEM WITH DIGIT-SENDING REPEATER

Filed Jan. 20, 1950 11 Sheets-Sheet 6

INVENTOR.
WILLIAM W. PHARIS
BY Winfred T. Powell
ATTORNEY

May 11, 1954 W. W. PHARIS 2,678,355

AUTOMATIC TELEPHONE SYSTEM WITH DIGIT-SENDING REPEATER

Filed Jan. 20, 1950 11 Sheets-Sheet 7

2-WAY F.S. AND TOLL REPEATER
C. D. O.

INVENTOR.
WILLIAM W. PHARIS
BY Winfred T. Powell
ATTORNEY

AUTOMATIC TELEPHONE SYSTEM WITH DIGIT-SENDING REPEATER

Filed Jan. 20, 1950 11 Sheets-Sheet 8

INVENTOR.
WILLIAM W. PHARIS

BY Winfred T. Powell
ATTORNEY

May 11, 1954 W. W. PHARIS 2,678,355

AUTOMATIC TELEPHONE SYSTEM WITH DIGIT-SENDING REPEATER

Filed Jan. 20, 1950 11 Sheets-Sheet 9

2-WAY F.S. AND TOLL REPEATER
C. D. O.

INVENTOR.
WILLIAM W. PHARIS
BY Winfred T. Powell
ATTORNEY

INVENTOR.
WILLIAM W. PHARIS
BY Winfred T. Powell
ATTORNEY

INVENTOR.
WILLIAM W. PHARIS
BY Winfred T. Powell
ATTORNEY

Patented May 11, 1954 2,678,355

UNITED STATES PATENT OFFICE 2,678,355

AUTOMATIC TELEPHONE SYSTEM WITH DIGIT-SENDING REPEATER

William W. Pharis, Rochester, N. Y., assignor to Stromberg-Carlson Company, a corporation of New York Application January 20, 1950, Serial No. 139,632

14 Claims. (Cl. 179—27)

This invention relates to telephone systems in general, but is concerned more particularly with telephone systems including a toll office, a community dial office (C. D. O.) and a tandem office, inter-connected with trunk lines and arranged to provide several desired features and to give more efficient and satisfactory service.

The broad general object of the invention is the provision of new and improved circuit arrangements for use in trunk circuits, repeater circuits and connector circuits in a tandem office network as illustrated in the trunking diagram of Figs. 1 and 2 of the accompanying drawings.

An additional and more specific object of the invention is the provision of a new repeater circuit in the tandem office which, in handling a call from the C. D. O. to the toll office, automatically sends the digit necessary for extending the call from the tandem office to the distant toll office. This makes it possible to use regular inter-office trunks for toll calls from the remote C. D. O., through the tandem office to the distant toll office and permits the use of a universal numbering plan for toll, that is, the usual digit 0 is dialled in the C. D. O. for selecting a trunk to the tandem office, after which the call is extended from the tandem office, through an incoming selector associated with the C. D. O.-tandem office trunk, to a trunk leading to the toll office. The same C. D. O.-tandem office trunks are used for free service calls between C. D. O. subscribers and tandem office subscribers, these trunks when selected in the C. D. O. from a local level (not level 0) omitting the automatic sending operation.

Another feature of the present invention relates to the provision of a marking conductor in the repeater and connector circuits for marking toll calls to provide the abovementioned operation, this same marking conductor being also used for transmitting supervision between the different stages in the system.

*General description*

Figs. 3 and 4 are circuit diagrams of the 2-way trunk repeater on the tandem office end of each 2-way trunk between the toll office and the tandem office.

Figs. 7, 8 and 9 are circuit diagrams of the 2-way repeater on the C. D. O. office end of each 2-way trunk between the C. D. O. and the tandem office.

Figs. 10 and 11 are circuit diagrams of the 2-way repeater on the tandem office end of each 2-way trunk between the tandem office and the C. D. O.

Figure 1:
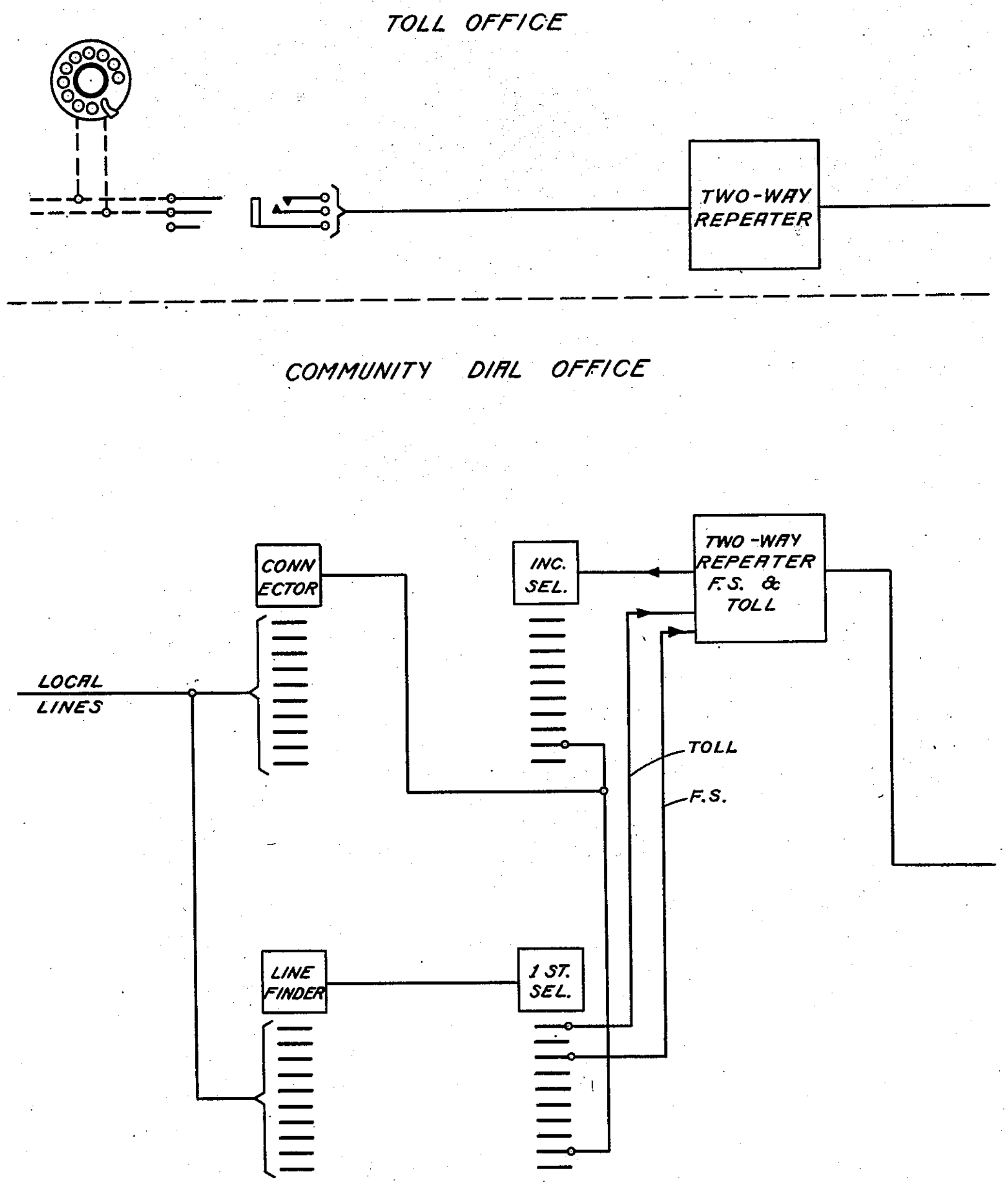
Figures 2, 12:
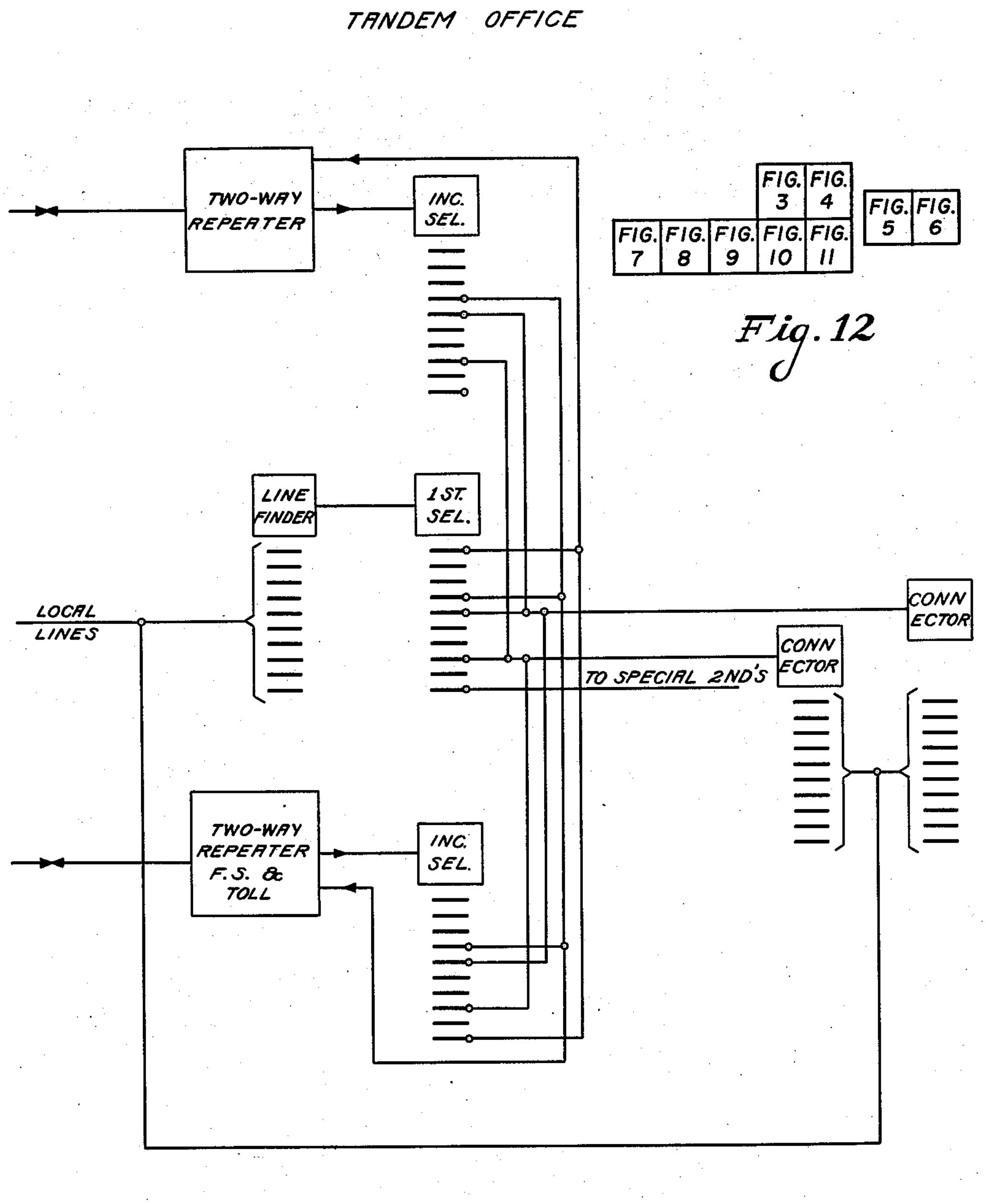
Fig. 12 is a chart showing how to arrange the circuit figures to show the complete system.

The trunking diagram, shown in Figs. 1 and 2, has been chosen to illustrate the invention as arranged to meet the requirements of a specific installation, wherein local lines in the C. D. O. are multipled to the banks of line finders and connectors in the usual manner. The line finders have their associated first selectors, the second level of which connects to local connectors for establishing local calls in the C. D. O. Traffic between the C. D. O. and the tandem office passes over 2-way trunks, one of which is shown connecting the 2-way repeater in the C. D. O. with the 2-way repeater in the tandem office. An incoming selector is associated with each 2-way repeater in the C. D. O. for handling calls incoming thereto, the second level of the incoming selectors being multipled to the second level of the first selectors for access to the connectors in this office. There are two paths of access from the local first selectors to the repeaters in the C. D. O., the first path being from level 8 for free service calls by directory number operation (no automatic sending) and the second path being from level 0 for handling calls in response to dialling 0 in the C. D. O., this latter operation effecting the automatic sending in the 2-way repeater in the C. D. O.

A free service and toll repeater is associated with each 2-way trunk in the tandem office and handles calls from the C. D. O. to the tandem office when the associated trunk is selected at level 8 or level 0 in the C. D. O. An incoming selector is associated with each repeater in the tandem office for handling calls from the C. D. O.

It is proposed to provide a 2-way repeater in the toll office and in the tandem office on each inter-office trunk between these offices. Each of these trunks terminates on a jack at the toll position in the toll office, to which connection is made by the usual plug and cord, to which the dial may be connected for dialling subscribers' numbers in the tandem office and in the C. D. O. by way of the repeater and associated incoming selector on the terminating end of each inter-office trunk.

The capacity of the tandem office is illustrated as being 200 lines, since two connector groups are shown, one being selected from the third level and the other being selected from the sixth level of all selector groups in this office. The local lines in the tandem office are connected to first selectors by means of associated line finders for calls originating in this office. The first level of the local first selectors is used for special calls such as information, complaint, wire chief and the like. The seventh level of all the tandem office selectors extends to the 2-way repeaters of the trunks to the C. D. O. for free service calls from the tandem office to the C. D. O. The first level of the incoming selectors on the tandem-C. D. O. inter-office trunks is multipled to the 0 level of the local first selectors for the purpose of extending a call from the C. D. O. to the toll office when the automatic sending operation is effected in the repeater in the C. D. O., in response to the selection of this repeater by a C. D. O. subscriber dialling 0 for a toll call.

It is believed that the invention will best be understood by describing in detail certain circuit operations involved in establishing calls of different classes. Due to the fact that a major portion of the circuit operations provided in the present system relates to repeater operation, it will be convenient to separate these circuit operations into different groups and to provide a heading for each group.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner, with all of the contacts associated with a particular relay being illustrated as attached to this relay by means of a dashed line. The negative side of the common exchange battery is indicated by a minus sign in parentheses and the positive side of the exchange battery, which is usually grounded, is indicated by a positive symbol in parentheses.

*Toll-tandem office call*

It will first be described how the repeater on the tandem office end of a toll-tandem office trunk operates, this repeater being illustrated in Figs. 3 and 4. When the toll operator plugs into the jack associated with the inter-office trunk, the repeater associated with this trunk (not shown in detail) functions to close a loop circuit across the trunk conductors leading to the tandem office. Since this operation is old and well known in the art, the detailed circuits in the toll office will not be shown or described. This closure of the trunk conductors effects the operation of relay PL in the repeater in the tandem office over a circuit which may be traced from (+), upper winding of relay PL, upper left hand winding of repeating coil RC, break contact of relay CB, tip trunk conductor TT extending to the toll office, through the closed circuit path provided in the repeater on the trunk in the toll office, ring trunk conductor RT, break contact of relay CB, lower left hand winding of repeating coil RC and lower winding of relay PL to (−). The operation of relay PL closes a circuit for operating relay RD2 extending from (+), make contact of relay PL and winding of relay RD2 to (−). Relay RD21 is now operated over a circuit extending from (+), make contact of relay RD2, break contact of relay RD1 and winding of relay RD21 to (−). Relay RD21 makes this trunk busy to outgoing calls from the tandem office to the toll office by applying (+) potential to conductors SB and 1SB leading to the bank multiple of the selectors over a circuit extending from (+), make contact of relay RD21 and conductor 116 to the bank multiple of the first selectors. The circuit to the incoming selector associated with the repeater in use is now closed, this circuit being traced from conductor 111, which is the tip conductor leading to the incoming selector, make contact of relay RD21, upper right hand winding of repeating coil RC, make contact of relay RD21, resistor 1RS, make contact of relay RD21, lower right hand winding of repeating coil RC, make contact of relay PL, make contact of relay RD21 and conductor 112 to the incoming selector. Although the detailed circuits of the incoming selector are not shown, it will be obvious that conductors 111 and 112 extend through break contacts of switching relay SW in the incoming selector to the windings of a CB relay and thence to (+) and (−). The CB relay operates over this closed circuit, operates its associated RD or holding relay and prepares the incoming selector for the first series of impulses.

It will now be assumed that the toll operator dials digit 3 to set the incoming selector on the third level and to select a connector in this level. These three impulses are repeated by relay PL, since the three impulses from the dial into the repeater in the toll office effect this repeater to repeat these three impulses into the repeater in the tandem office. The first release of relay PL in Fig. 3 opens up the above-described circuit including conductors 111 and 112 for providing the first impulse in the incoming selector. The release of relay PL also closes an operating circuit for relay SH which may be traced from (+), break contact of relay PL, make contact of relay RD21 and winding of relay SH to (−). The closure of the uppermost make contact of relay SH short-circuits the right hand windings of repeating coil RC to remove the impedance of these windings from the impulse circuit to the incoming selector. It will be noted that resistor 2RS and condenser C1 are connected across the make contacts of relay PL, thus providing a spark absorbing circuit for these contacts during impulsing. When relay PL operates to mark the end of the first impulse, the trunk circuit to the incoming selector is closed at the make contact of relay PL for marking the end of this impulse in the incoming selector by closing a circuit across conductors 111 and 112. Relay SH1 is operated at this time over a circuit which may be traced from (+), make contact of relay PL, break contact of relay SH1, make contact of relay SH and winding of relay SH1 to (−). Relay SH1 is locked operated over a circuit extending from (+), make contact of relay SH1, make contact of relay SH and winding of relay SH1 to (−). When relay PL releases to mark the beginning of the second impulse, conductors 111 and 112 are again opened and are closed when relay PL operates to mark the end of the second impulse. When relay PL releases to mark the beginning of the third impulse, conductors 111 and 112 are opened and are again closed when relay PL operates to mark the end of the third impulse. Consequently, the incoming selector is stepped to the third level in response to these three impulses transmitted from the toll operator's position. During the intermittent operation of relay PL, the winding of relay SH is de-energized but this relay does not release during impulsing, due to its slow acting characteristics. When relay PL remains operated at the end of the impulse transmission for this digit, relay SH is de-energized long enough to permit it to release for removing the short-circuit from the right hand windings of the repeating coil. The release of relay SH opens up the above-described circuit to the winding of relay SH1 for effecting the release of this relay. The remaining digits of the number are dialled by the toll operator and relays PL, SH and SH1 function in the manner just described for each digit, relays SH and SH1 being operated at the beginning of the digit and released at the end of the digit. These remaining impulses are effective to impulse the selected connector, it being understood that the incoming selector selects an idle connector following the receipt of the first digit. This connector operation will be later described.

Particular attention is now called to the fact that the operation of relay SH1 disconnects (+) from the left hand terminals of relay HS and connects (—) to these terminals, the circuit to (—) extending to these terminals, the circuit to RD21 and a make contact of relay SH1. Conductor 113, extending to the incoming selector, is connected to (+) through resistor 3RS during the operation of the selector, consequently relay HS is not operated because the circuit to (—) (above described) energizes both windings of this relay in opposition as indicated by the arrows associated with the windings of the relay. This also applies to the operation during the remaining digits, since conductor 113 is extended by way of wiper HS of the incoming selector to conductor HS incoming to the connector, this HS conductor being normally connected to (+) through a resistor for preventing the operation of the HS relay during dialling.

When the called party answers, conductor HS incoming to the connector is switched from (+) to (—) (as will be pointed out in describing the connector operation), thus operating relay HS of the repeater, since only its upper winding is now energized from this circuit to (—) by way of the upper winding and break contact of relay SH1 to (+). This switch from (+) to (—) when the called party answers is provided by contacts on the AA relay in the connector. The operation of relay HS connects (+) to the winding of relay RD2 to hold this relay energized for in turn maintaining relay RD21 energized to maintain (+) potential on conductors SB and 1SB to keep this trunk busy at the selector banks as long as the called party is on the line. This holding of the RD2 and RD21 relays also holds the circuit while the called party is on the line, conductors 111 and 112, extending to the connector circuit, being closed by way of the above described circuit including resistor 1RS. The operation of relay HS closes a circuit for operating relay CB which may be traced from (+), lower winding of relay CB, conductor 118, resistor 4RS, make contact of relay HS, conductor 119 and upper winding of relay CB to (—). The operation of relay CB reverses the battery to the toll trunk for supervisory purposes. The operation of relay CB also disconnects the spark absorbing circuit including resistor 2RS and condenser C1 from across the right hand winding of the repeating coil RC for removing the transmission loss in the circuit which would otherwise be effected by this spark absorbing circuit.

When the conversation is terminated and the operator releases the connection, the repeater in the toll office opens up the inter-office trunk conductor for releasing relay PL at the tandem office repeater and this relay in turn opens up and releases relay RD2. Relay RD2 opens up and releases relay RD21, this latter relay disconnecting (+) from conductors SB and 1SB for rendering this trunk idle to outgoing calls from the tandem office to the toll office. The release of relay PL closes the above described circuit for operating relay SH and this relay is opened up and released when relay RD21 releases. This momentary operation of relay SH is of no effect. When the called party hangs up the receiver, the HS conductor incoming to the connector is switched back to (+), consequently the windings of the HS relay are de-energized for effecting the release of this relay, which in turn opens up and releases relay CB for straightening out the battery to the toll office to give the toll operator "unhook" supervision.

On an outgoing call from the tandem office to the toll office, the calling party in the tandem office dials 0 for advancing the first selector (not shown) to the tenth level for selecting a 2-way repeater associated with an idle trunk leading to the toll office. When the selector seizes the selected repeater and operates its switching relay for switching the calling line circuit through to the repeater in the tandem office, the closed circuit across the calling line operates relay CB in the repeater illustrated in Fig. 3. This circuit may be traced from (+), lower winding of relay CB, break contact of relay RD21, upper right hand winding of repeating coil RC, tip trunk TB leading to the selector bank, through the selector, line finder, line circuit and over the calling line and substation circuits in series, back through the line circuit, the line finder and the selector to conductor RB, break contact of relay RD21, lower right hand winding of repeating coil RC, break contact of relay RD21 and upper winding of relay IB to (—). The operation of relay CB reverses the battery by way of the winding of relay CB to (—). The operation of ing to the toll office for operating the proper relay in the repeater circuit associated with this trunk in the toll office for signalling the toll operator, in the well-known manner. The operation of relay CB also opens up the circuit including resistor 2RS and condenser C1 for removing this spark absorbing circuit from the repeating coil circuit to eliminate any loss in transmission which would be involved in the conversational circuit if this spark absorbing circuit was left across the repeating coil.

The operation of relay CB closes a circuit for operating relay RD1 extending from (+), break contact of relay RD21, make contact of relay CB and winding of relay RD1 to (—). The operation of relay RD1 applies (+) potential to the incoming sleeve conductor SB for making this trunk busy to other selectors and to provide a holding circuit for the switches used in this call. This circuit may be traced from (+), break contact of relay CT1, conductor 120, make contact of relay RD1 and conductor SB. Coin box tone relay CT is now operated over a circuit extending from (+), break contact of relay RD2, make contact of relay RD1, conductor 121 and winding of relay CT to (−). Relay CT closes an obvious circuit for operating relay CT1. The operation of relay CT1 disconnects direct (+) from the above described circuit extending back to conductor SB, thus inserting the lower winding of tone coil TC in this holding circuit. The operation of relay CT1 also applies ring back tone to the calling line over a circuit which may be traced from the source of ring back tone RBT, condenser C2, break contact of relay SH1, conductor 122, make contact of relay CT1, conductor RB and back over the calling switches to the calling line circuit.

Figure 3:
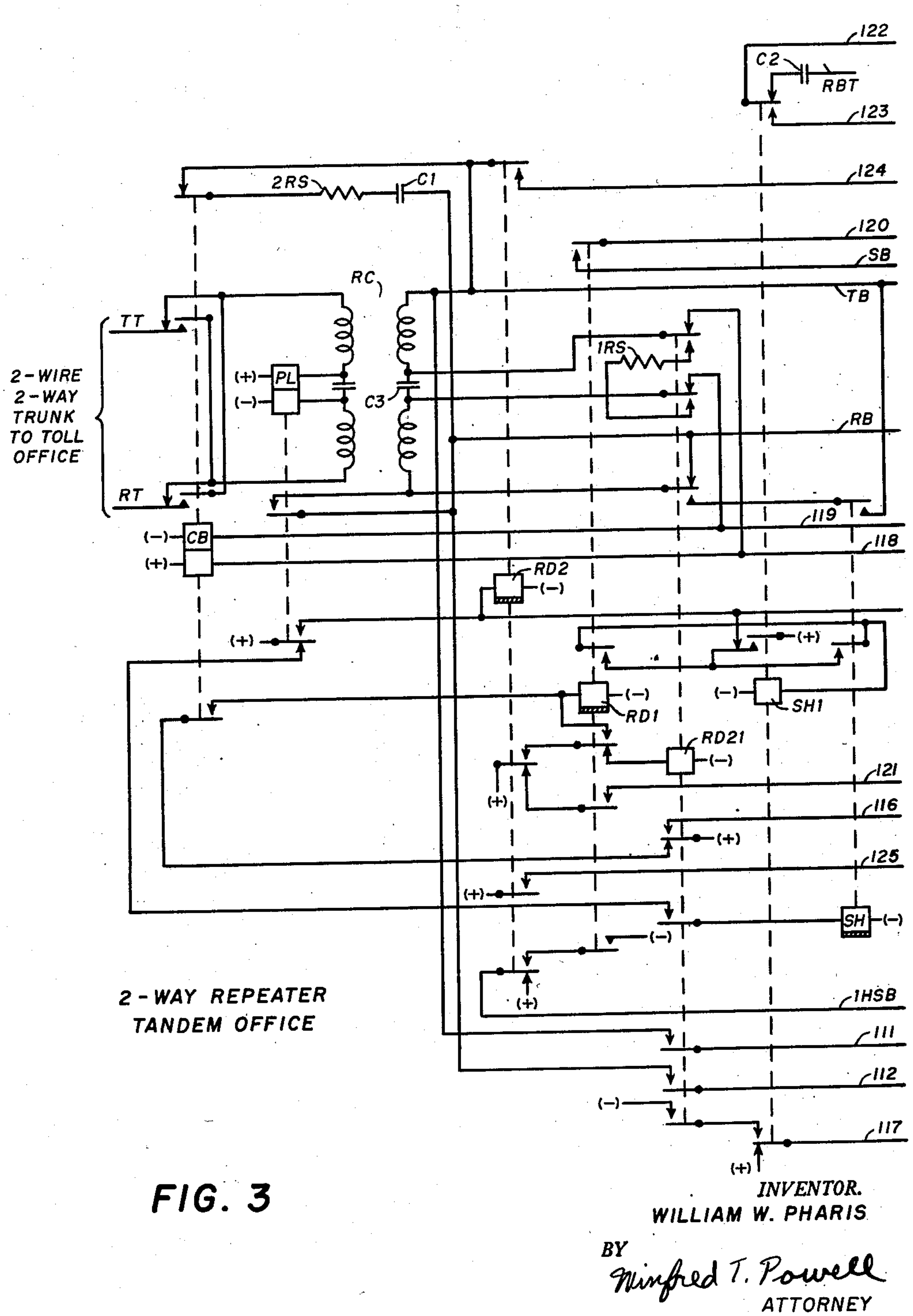

When the operator answers by plugging the answering plug into the incoming trunk jack, the normally closed high resistance path in the trunk conductors is reduced in the repeater in the toll office (not shown) to a low resistance value in the well-known manner for permitting sufficient current to flow over the loop trunk circuit for operating relay PL in Fig. 3. The operation of relay PL closes a circuit for operating relay RD2 extending from (+), make contact of relay PL and winding of relay RD2 to (−). Relay SH1 is operated at this time over a circuit extending from (+), make contact of relay PL, break contact of relay SH1, make contact of relay RD1 and winding of relay SH1 to (−). Relay SH1 closes a locking circuit for itself which may be traced from (+), make contact of relay SH1, make contact of relay RD1 and winding of relay SH1 to (−). The operation of relay SH1 opens up the above described circuit to conductor RBT for disconnecting the ring back tone from the calling line as an indication that the operator has answered the call. The operation of relay RD2 opens up the above described circuit for relay CT for effecting the release of this relay which in turn opens up and releases relay CT1. During the interval between the operation of relay SH1 and the release of relay CT1, the coin box tone circuit is connected to the conductors of the trunk to indicate to the toll operator if the calling line is a paystation line. This circuit may be traced from the right hand terminal and upper winding of coil TC, make contact of relay CT1, conductor 123, make contact of relay SH1, conductor 122, make contact of relay CT1, conductor RB, break contact of relay RD21 in multiple with make contact of relay PL, lower right hand winding of repeating coil RC, condenser C3, upper right hand winding of repeating coil RC, make contact of relay RD2, conductor 124, make contact of relay CT1 and condenser C4 to the left hand terminal of the upper winding of coil TC. As is well known in the operation of paystation circuits, a paystation or coin box line has a source of coin box tone connected to the sleeve conductor of this line, thus extending this circuit through the uppermost make contact of relay RD1 to the lower winding of coil TC. Consequently during the interval between the operation of relay SH1 and the release of relay CT1, this coin box tone (if the calling line is a paystation line) is induced into the upper winding of coil TC for application to the trunk circuit as above described.

After the conversation to the distant toll office is terminated and the calling party hangs up the receiver, the opening up of the calling line circuit opens up and releases relay CB of Fig. 3. This straightens out the battery connected to the inter-office trunk circuit for giving the distant operator "on hook" supervision. Now when the operator takes down the connection, the circuits at the toll office function to again switch the loop trunk circuit from a low resistance to a high resistance value for effecting the release of relay PL of Fig. 3. The release of relay PL opens up the above described circuit for relay RD2 for effecting the release of this relay, after which the above described circuit to relay RD1 is opened, this circuit being established to lock relay RD1 when relay RD2 was operated. The release of relay RD1 disconnects (+) potential from conductor SB for releasing the incoming switches and for marking this trunk idle for other connections. The release of relay RD1 also opens up the above described circuit to relay SH1 for releasing this relay. This restores the circuits to normal ready for another call.

*C. D. O.-tandem office trunk call*

Figure 7:
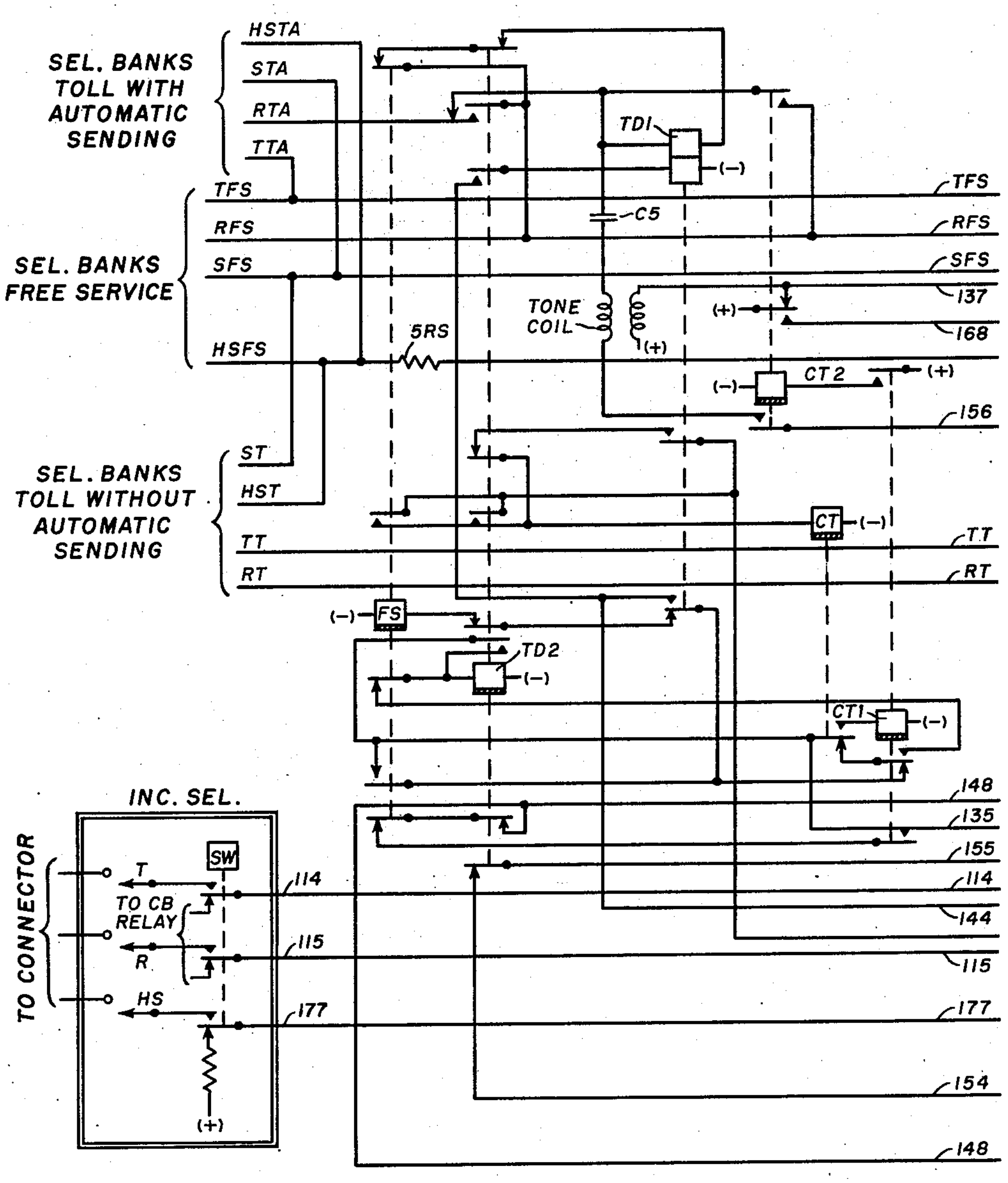
Figure 8:
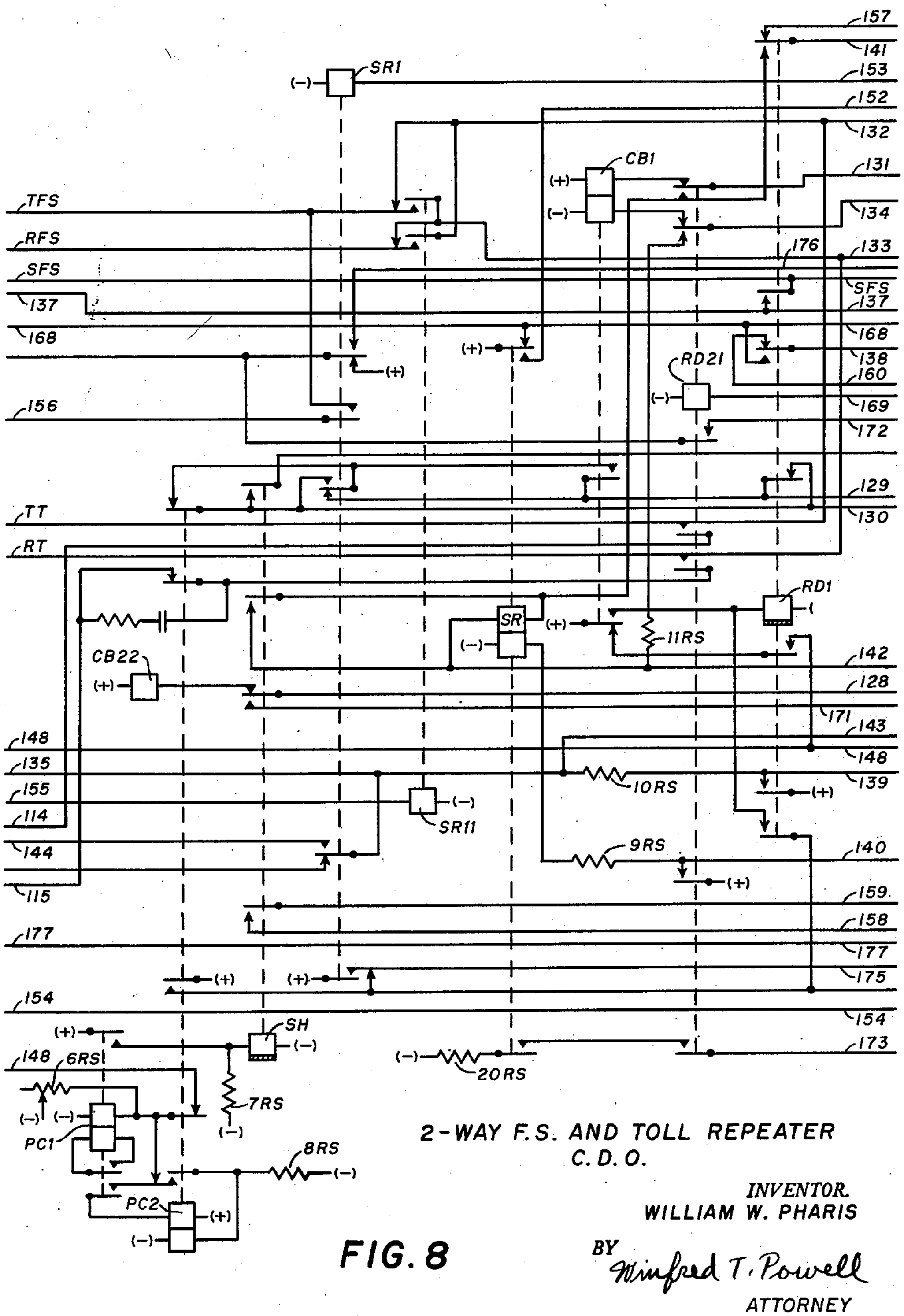
Figure 9:
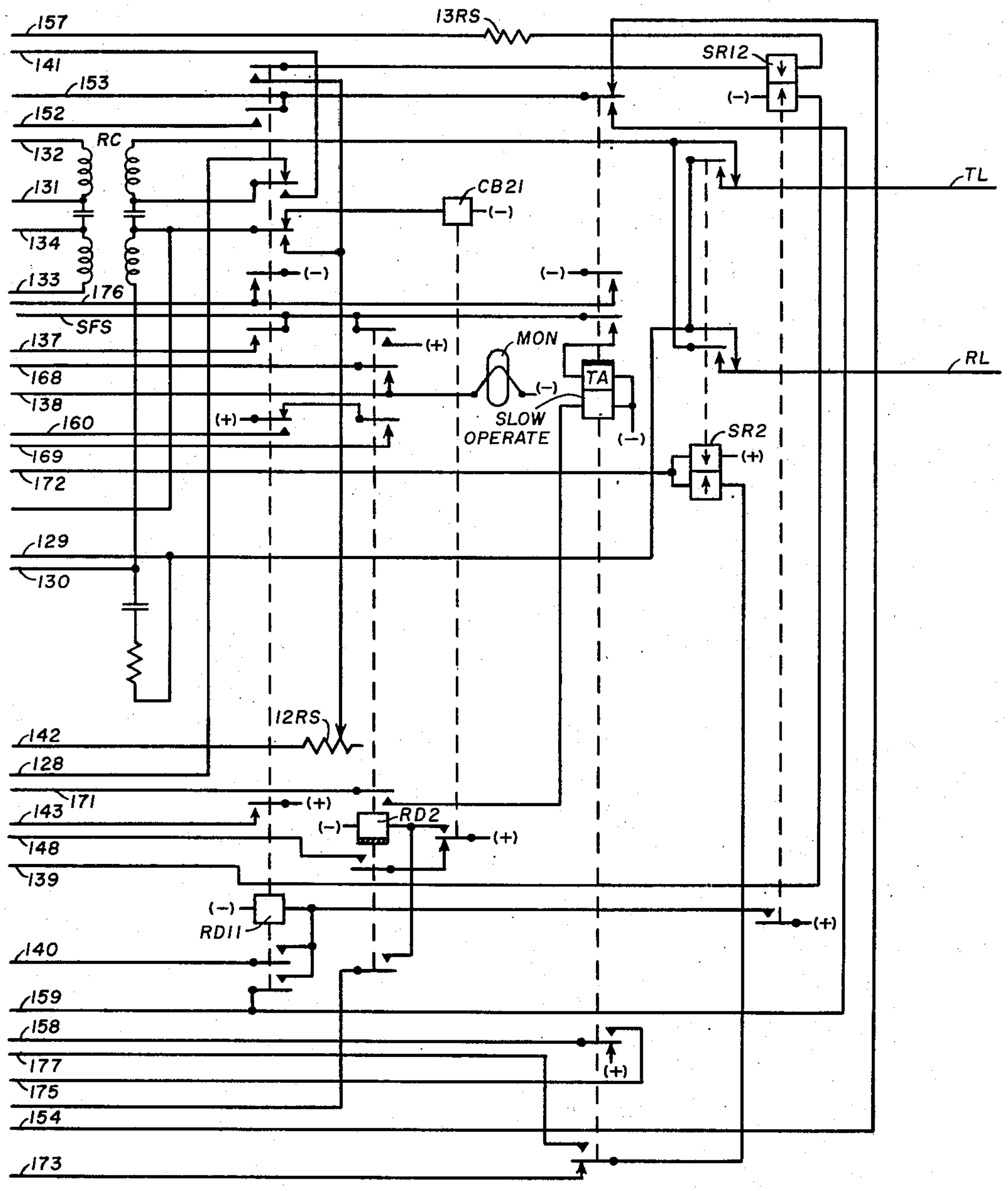
Figure 10:
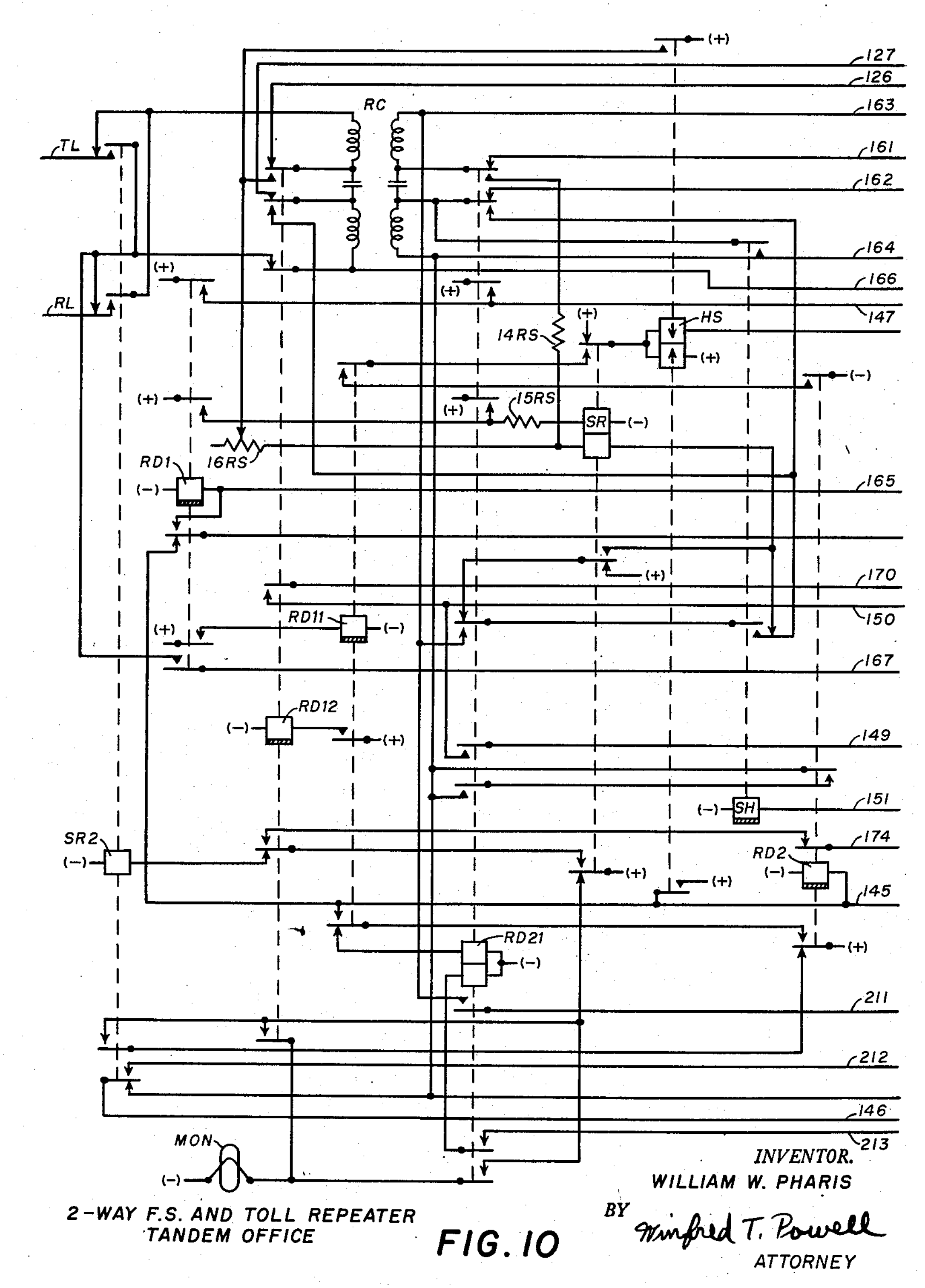
Figure 11:
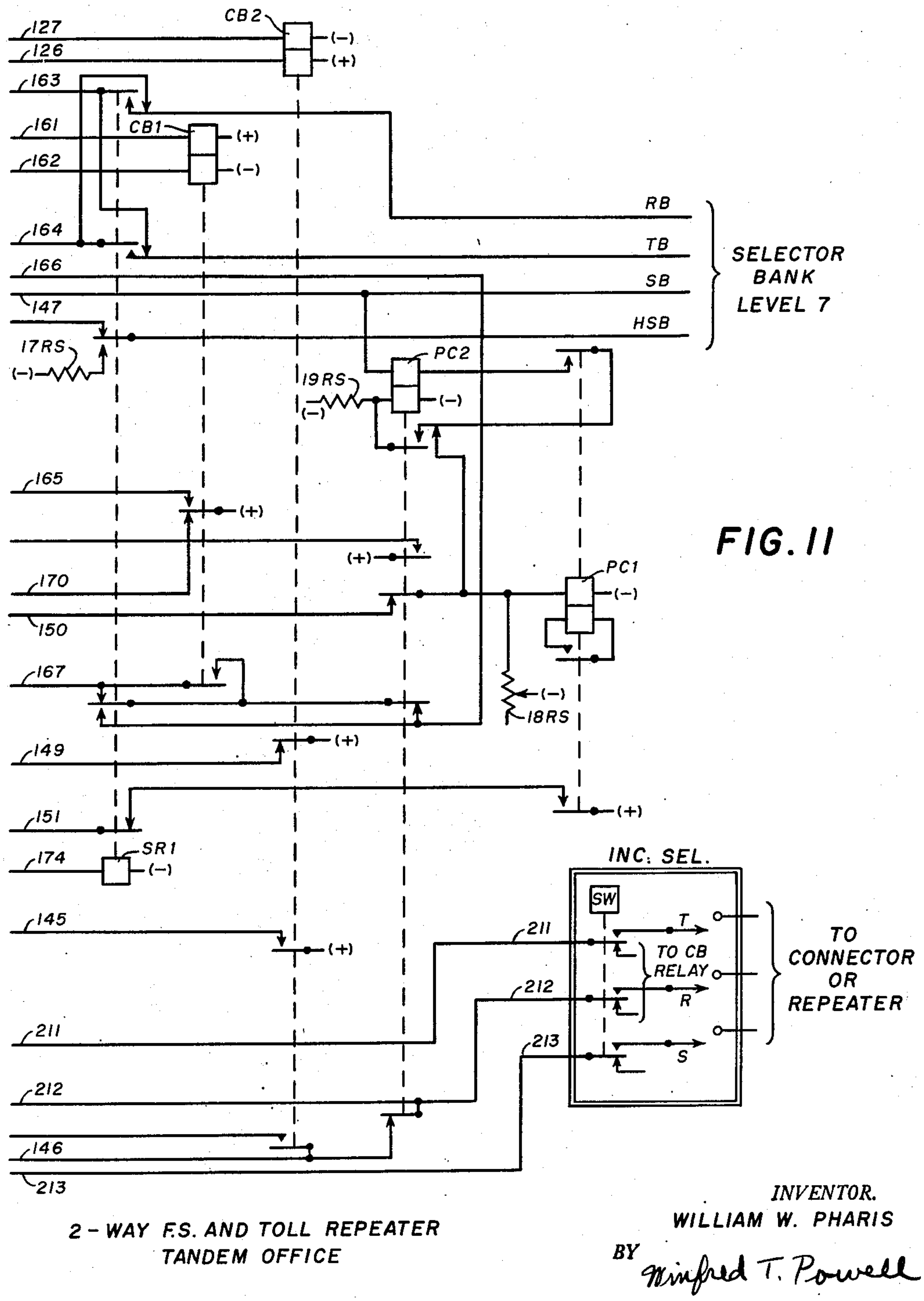

It will now be described how the inter-office trunk circuits operate on a call originated in the C. D. O. of Fig. 1 and terminated in the tandem office of Fig. 2. The 2-way repeater located at the C. D. O. end of the trunk circuit is illustrated in Figs. 7, 8 and 9 and the 2-way repeater associated with the tandem office end of the same trunk circuit is illustrated in Figs. 10 and 11. Before describing the operation of the circuits in response to an originating call in the C. D. O., it will be helpful to point out the normal condition of the inter-office trunk circuit, describing how the (+) and (−) terminals of the common batteries in each office are normally connected to the trunk conductors so that no current flows over the conductors of a trunk circuit during the normal condition. Starting with the repeater in the tandem office (Figs. 10 and 11) the normal battery circuit may be traced from (+), lower winding of relay CB2, conductor 126, break contact of relay RD12, upper left hand winding of repeating coil RC, break contact of relay SR2, tip toll line conductor TL to the C. D. O., break contact of relay SR2 in the C. D. O. repeater (Fig. 9), upper right hand winding of repeating coil RC, break contact of relay RD11, conductor 128, break contact of relay SH and winding of impedance coil CB22 to the (+) terminal of the battery in this office. Returning to the tandem office repeater circuit, the minus terminal of the battery in this office is connected to the upper winding of relay CB2 and extends by way of conductor 127 and a break contact of relay RD12, lower left hand winding of repeating coil RC, break contact of relay RD12, break contact of relay SR2 and toll line conductor RL to the C. D. O. From this conductor in the C. D. O., the circuit may be traced through a break contact of relay SR2, conductor 129, break contact of relay RD1, conductor 130, lower right hand winding of repeating coil RC, break contact of relay RD11, and winding of relay CB21 to (−). It will be thus seen that, during the normal condition of the circuits, the same terminals of the batteries at each end of the trunk circuit are connected together by way of the various relay windings, contacts and trunk line conductors so that no current normally flows over the trunk circuit.

Now when the calling party on the calling line in the C. D. O. removes the receiver and dials the proper digit into the first selector to which the calling line is connected by the line finder in the well-known manner, the first selector advances to the selected level (level 8 for selecting a free service call to the tandem office in this example) for extending the calling line conductors to the 2-way repeater associated with the first idle inter-office trunk in the C. D. O. When this repeater is selected, the closed circuit across the calling line operates relay CB1 of the C. D. O. repeater over a circuit which may be traced from (+), upper winding of relay CB1, break contact of relay RD21, conductor 131, upper left hand winding of repeating coil RC, conductor 132, break contact of relay SR11, tip conductor TFS leading to the free service bank terminals in the selector, through the first selector, line finder, line circuit and substatiton circuit in series, back over the ring conductor of the circuits and conductor RFS in the repeater, break contact of relay SR11, conductor 133, lower left hand winding of repeating coil RC, conductor 134, break contact of relay RD21, and lower winding of relay CB1 to (—). Relay CB1 closes a circuit for operating relay RD1 extending from (+), make contact of relay CB1, and winding of relay RD1 to (—). The operation of relay RD1 primes relay FS to make it fast operating when its operating circuit is closed, this priming circuit extending from (+), make contact of relay RD1, high resistance 10RS, conductor 135, break contact of relay CT, break contact of relay CT1, break contact of relay TD1, break contact of relay TD2 and winding of relay FS to (—). Relay RD1 also applies (+) potential to the incoming sleeve conductor SFS to which the selector and finder circuits are connected, for making this repeater busy and for holding the preceding circuits, this circuit being traced from (+), break contact of relay CT2, conductor 137, make contact of relay RD1 and conductor SFS. This conductor is also multipled to conductors STA and ST leading to other selector levels for making this trunk circuit busy in these other levels if and when used. The monitor lamp MON associated with the C. D. O. repeater is now lighted to give the switchboard attendant an indication that the repeater has been seized and that the call has not been answered. It will be later explained how the monitor lamp circuit is deenergized when the call is answered. It will also be understood that other monitor lamps associated with other repeaters may have their battery feed terminals connected through a low resistance relay, instead of being connected directly to (—) as indicated, so that this relay may be operated in response to a call for operating coin box tone circuits and the like. The circuit for lighting lamp MON may be traced from (+), break contact of relay SR, make contact of relay RD1, conductor 138 and lamp MON to (—).

Relay SR12 is operated at this time over a circuit extending from (+), make contact of relay RD1, conductor 139 and lower winding of relay SR12 to (—). The circuit is now closed for operating relay RD11 which may be traced from (+), make contact of relay SR12 and winding of relay RD11 to (—). The operation of relay RD11 primes relay SR so that it will be operated when the battery is reversed over the toll line in response to the answering of the call and to prevent the operation of the SR relay when battery flows in the normal direction over the toll line before the call is answered. This priming circuit may be traced from (+), make contact of relay SR12, make contact of relay RD11, conductor 140, high resistance 9RS and lower winding of relay SR to (—). The operation of relay RD11 energizes the toll line trunk over a circuit which may be traced from (+), lower winding of relay CB2 in the tandem office repeater, conductor 126, break contact of relay RD12, upper left hand winding of coil RC, break contact of relay SR2, toll line conductor TL, break contact of relay SR2 in the C. D. O. repeater, upper right hand winding of coil RC, make contact of relay RD11, conductor 141, make contact of relay RD1, upper winding of relay SR, conductor 142, resistor 12RS, make contact of relay RD11, lower right hand winding of coil RC, conductor 130, break contact of relay PC2, break contact of relay SR1, conductor 129, break contact of relay SR2, toll line conductor RL, break contact of relay SR2 in the tandem office repeater, break contact of relay RD12, lower left hand winding of coil RC, break contact of relay RD12, conductor 127 and upper winding of relay CB2 to (—). It will be seen that the toll trunk is now energized through the upper winding of relay SR in the C. D. O. repeater in series with the associated resistor 12RS. The energization of the upper winding of relay SR over this circuit is in opposition to the energization of the lower winding so that relay SR does not operate at this time.

Relay FS now receives full current for operating over a circuit which may be traced from (+), make contact of relay RD11, conductor 143, conductor 135, break contact of relay CT, break contact of relay CT1, break contact of relay TD1, break contact of relay TD2 and winding of relay FS to (—). Relay FS closes a locking circuit for itself which may be traced from this same (+) at the make contact of relay RD11, conductors 143 and 135, make contact of relay FS, break contact of relay TD1, break contact of relay TD2, and winding of relay FS to (—). Relay CT is now operated over a circuit which may be traced from (+), make contact of relay RD11, conductor 143, break contact of relay SR1, conductor 144, make contact of relay FS and winding of relay CT to (—). Relay CT1 is now operated over a circuit extending from (+) on conductor 135, make contact of relay CT and winding of relay CT1 to (—). Relay CT1 closes an obvious circuit for operating relay CT2. It will be noted that the operation of either relay CT or CT1 opens up the above described operating circuit for relay FS, but that this latter relay remains operated over its previously described locking circuit. This places the circuits in the C. D. O. repeater in condition for receiving the impulses of the first digit.

The relay operations in the tandem office repeater will now be described. The closure of the toll trunk by way of the windings of relay CB2 in the tandem office repeater effects the operation of this relay and it in turn closes a circuit for operating relay RD2 which may be traced from (+), make contact of relay CB2, conductor 145 and winding of relay RD2 to (—). A circuit is now closed for operating relay RD21 which may be traced from (+), make contact of relay RD2, break contact of relay RD11 and upper winding of relay RD21 to (—). Relay SR in the tandem office repeater is now primed over a circuit which may be traced from (+), make contact of relay RD21, resistor 15RS and upper winding of relay SR to (—). The trunk to the incoming selector associated with the repeater in the tandem office is now energized of a circuit which may be traced from (+) through a winding of the CB relay associated with the selector (not shown), break contact of relay SW in the incoming selector, conductor 211, make contact of relay RD21, upper right hand winding of coil RC, make contact of relay RD21, resistor 14RS, lower winding of relay SR, break contact of relay SH, make contact of relay RD21, lower right hand winding of coil RC, make contact of relay RD2, make contact of relay RD21, break contact of relay SR2, conductor 146, break contact of relay PC2, conductor 212 and break contact of relay SW to the other winding of the CB relay in the incoming selector. It will be seen that the lower winding of relay SR in the tandem office repeater is energized in series with resistor 14RS over this circuit extending to the incoming selector. The energization of this winding of the SR relay is in opposition to that of the upper winding so that the relay does not operate at this time.

The operation of relay RD21 makes this 2-way trunk busy in the banks of the selectors in the tandem office to calls outgoing to the C. D. O. by applying (+) to conductor SB over a circuit which may be traced from (+), make contact of relay RD21, conductor 147 and conductor SB leading to the sleeve or test terminals in the seventh level of the selector banks, it being assumed that this is the level for selecting trunks on calls from the tandem office to the C. D. O. The monitor lamp associated with the repeater in the tandem office is lighted over a circuit which may be traced from (+), break contact of relay SR, make contact of relay RD21 and lamp MON to (—). The energization of conductors 211 and 212 extending to the incoming selector operates the associated CB and RD relays (not shown) and the RD relay of this selector applies (+) back over conductor 213 for holding the RD21 relay over a circuit which may be traced from conductor 213, make contact and lower winding of relay RD21 to (—). This places the circuits of the repeater and the incoming selector in the tandem office in condition for receiving the first digit.

Referring back to the C. D. O. repeater, it will be assumed that the calling party dials 3 for advancing the incoming selector in the tandem office to the third level for selecting a connector in the local connector group for extending a call to a line in this group. These three impulses are repeated by relay CB1 of the tandem office repeater, since this relay is energized over the calling line. During the intermittent operation of relay CB1, relay RD1 is de-energized but is not released because of its slow acting characteristics. An additional energizing circuit is completed to the winding of relay RD1 during the operation of pulse repeating relay PC2 (later described) by way of a circuit extending from (+), make contact of relay PC2, make contact and winding of relay RD1 to (—), this circuit assisting in holding the RD1 relay operated during the impulsing operation of the CB1 relay.

The first release of relay CB1 closes a circuit for operating relay PC1 which may be traced from (+), break contact of relay CB1, make contact of relay RD1, conductor 148, break contact of relay CB2 and upper winding of relay PC1 to (—). Relay PC1 closes a circuit for operating relay SH extending from (+), make contact of relay PC1 and winding of relay SH to (—). Relay SH, at its uppermost make contact short-circuits the lower right hand winding of coil RC and at its second uppermost make contact short-circuits the upper winding of relay SR for improving the impulse repeating circuit to the distant tandem office. The other contacts on the SH relay are used in connection with a call in the other direction over the trunk circuit. When relay CB1 operates to mark the end of the first impulse a circuit is closed for operating relay PC2 which may be traced from (+), upper winding of relay PC2, make contact of relay PC1, break contact of relay PC2 and upper winding of relay PC1 to (—). Relay PC1 is locked operated over this circuit including the upper winding of relay PC2, it being noted that the circuit to direct (+) to the upper winding of relay PC1 above described, is opened when relay CB1 operates. Now when relay PC2 operates the above described locking circuit for relay PC1 is opened and this relay is released. It releases after a short predetermined time interval because its lower winding is short-circuited when the relay is operated and because of the adjustable shunt across its upper winding provided by resistor 6RS. The operation of relay PC2 closed a locking circuit for itself extending from (+), upper winding of relay PC2, make contact of relay PC1, make contact and lower winding of relay PC2 to (—), this locking circuit being opened by the release of relay PC1 for opening up and releasing relay PC2. Relay PC2 is timed in its release operation by the connection of shunt resistor 8RS across its lower winding.

Now when relay CB1 releases to mark the beginning of the second impulse, relay PC1 is operated over the previously described circuit and when relay CB1 operates to mark the end of the second impulse, relay PC1 is locked, relay PC2 is operated and locked, after which relay PC1 is released and then relay PC2 is released, all in the previously described manner. Furthermore, when relay CB1 releases to mark the beginning of the third impulse, relay PC1 is again operated and when relay PC1 operates to mark the end of the third impulse relay PC1 is locked operated, relay PC2 is operated and locked, after which relay PC1 is released for releasing relay PC2 in the previously described manner. During the release of relay PC1, the circuit of relay SH is de-energized but this relay does not release due to its slow acting characteristics until the end of the impulses of this digit, at which time relay PC1 remains released for a sufficiently long interval to effect the release of relay SH.

During the intermittent operation of relay PC2, the toll trunk line is impulsed. At each operation of relay PC2 the above described circuit, including the toll line conductors, is opened at the uppermost break contact of this relay and is closed at this contact when the PC2 relay is released. When relay SH releases to mark the end of the digit, the above described short circuit across the windings of relay SR and coil RC is removed.

Referring now to the tandem office repeater, each impulse in the toll trunk (open circuit condition) effects the release of relay CB2 connected to this trunk circuit. Consequently relay CB2 repeats the impulses transmitted by relay CB1 in the C. D. O. by the dialling operation. Relay RD2 in the tandem office is not released during the intermittent operation of the CB2 relay because of its slow acting characteristics. The first release of relay CB2 in the tandem office repeater closes a circuit for operating relay PC1, this repeater extending from (+), break contact of relay CB2, conductor 149, make contact of relay RD21, conductor 150, break contact of relay PC2 and upper winding of relay PC1 to (—). Relay PC1 closes a circuit for operating relay SH extending from (+), make contact of relay PC1, break contact of relay SR1, conductor 151 and winding of relay SH to (—). Relay SH short circuits the lower right hand winding of the repeating coil RC in the tandem office repeater and connects the ring side of the circuit leading to the incoming selector (conductor 212) by way of the impulsing contacts of relay PC2, conductor 146 and break contact of relay SR2, make contacts of relays RD21 and RD2 in series, make contact of relay SH, make contact of relay RD21, make before break make contact of relay SH, make contacts in series of relay RD21 and conductor 211 to the incoming selector, thus removing the windings of all coils in the repeater so that the impulse circuit to the incoming selector, through contacts of the PC2 relay may lead direct over a circuit with all impedances and resistances removed from this circuit.

The operation of relay CB2 at the end of the first impulse effects a locking circuit for relay PC1 and an operating circuit for relay PC2 which may be traced from (+), make contact of relay RD21, conductor 147, upper winding of relay PC2, make contact of relay PC1, break contact of relay PC2 and upper winding of relay PC1 to (—). Relay PC2 operates and opens up the above described circuit including relay PC1 for effecting the release of this latter relay, while relay PC2 is locked operated until relay PC1 releases over a circuit extending from (+), make contact of relay RD21, conductor 147, upper winding of relay PC2, make contact of relay PC1, make contact and lower winding of relay PC2 to (—). When relay CB2 releases to mark the beginning of the second impulse, relay PC1 is operated and when relay PC2 operates to mark the end of the second impulse, relay PC1 is locked and relay PC2 is operated and locked, after which relay PC1 releases for effecting the release of relay PC2, all in the previously described manner. When relay CB2 releases to mark the beginning of the third impulse, relay PC1 is again operated and when relay CB2 operates to mark the end of this impulse, relay PC1 is locked, relay PC2 is operated and locked and relay PC1 is released for effecting the release of relay PC2, all in the previously described manner. It will thus be seen that relay PC2 repeats the impulses provided by relay CB2, this latter relay repeating the impulses received from the distant office. When relay PC1 releases to mark the end of the last impulse of the digit, it remains in its released position long enough to effect the release of relay SH for again including the windings of the SR relay and the repeating coil in the circuit to the incoming selector.

Since the lowermost break contact of relay PC2 is included in the circuit to the CB relay of the incoming selector, the intermittent operation of relay PC2 impulses the incoming selector in accordance with the received impulses for advancing the selector to the third level in this example. When the incoming selector advances to the selected level and connects with the selected trunk in this level, the above described closed circuit across conductors 211 and 212, including the lower winding of relay SR and the windings of repeating coil RC, is completed for operating the impulse relay in the selected connector. Before describing the operation of the connector (Figs. 5 and 6) it will be explained how the repeaters operate in response to the answering of the call and in response to the release of the connection.

It may be helpful to point out at this time how the circuits, including the toll line conductors, are energized before the called party answers. Beginning with the lower winding of relay CB2 in the tandem office repeater, (+) extends through this winding, conductor 126, break contact of relay RD12, upper left hand winding of coil RC, break contact of relay SR2, toll line conductor TL, break contact of relay SR2 in the C. D. O. repeater, upper right hand winding of coil RC, make contact of relay RD11, conductor 141, make contact of relay RD1, upper winding of relay SR, conductor 142, resistor 12RS, make contact of relay RD11, lower right hand winding of coil RC, conductor 130, break contact of relay PC2, make contact of relay CB1, conductor 129, break contact of relay SR2, toll line conductor RL, break contact of relay SR2 in the tandem office repeater, break contact of relay RD12, lower left hand winding of coil RC, break contact of relay RD12, conductor 127 and upper winding of relay CB2 to (—). Since this circuit includes the resistances of the CB2 relay, the toll line conductors, the upper winding of relay SR in the repeater in the tandem office and the resistor 12RS, sufficient current flows to hold relay CB2 operated. However, the current flow over this circuit is in the normal direction over the toll line and prevents the operation of relay SR of Fig. 8.

When the call is answered in tandem office, the connector answering relay reverses the battery back over conductors 211 and 212 and since the lower winding of relay SR is included in this circuit, the reversal of the battery connection effects the operation of relay SR. A circuit is now closed for operating relay SR2 which may be traced from (+), make contact of relay SR, break contact of relay RD12 and winding of relay SR2 to (—). The operation of relay SR also opens up the above described circuit for lamp MON for extinguishing this lamp. The operation of relay SR2 reverses the circuit, including the toll line conductors extending to the windings of relay CB2, thus causing a reverse current flow over the toll line and since the upper winding of relay SR in the C. D. O. repeater is included in the toll line circuit, this relay operates and closes a circuit for operating relay SR1 extending from (+), make contact of relay SR, conductor 152, make contact of relay RD11, conductor 153, and winding of relay SR1 to (—). Relay SR11 is also operated at this time over a circuit which may be traced from (+), make contact of relay SR, conductor 152, make contact of relay RD11, break contact of relay TA, conductor 154, break contact of relay TD2, conductor 155 and winding of relay SR11 to (—). The operation of relay SR11 reverses battery back to the calling line for supervisory purposes. The operation of relay SR1 connects a bridge across the impulse contacts of relay PC2 in the C. D. O. repeater and switches the incoming conductor HSFS from (+) at the break contact of relay SR1 to (—) at the make contact of relay RD11 for supervision of this HS lead when provided.

In order to transmit a coin box tone from a calling paystation line to the distant office on this call, for the purpose of indicating that it is a calling paystation line if the call goes to an operator, the tone coil shown in the left hand portion of Fig. 7 is connected across the toll line circuit by way of a path which may be traced from the lower terminal of the left hand winding of the tone coil, make contact of relay CT2, conductor 156, make contact of relay SR1, break contact of relay SR11, conductor 132, upper left hand winding of coil RC, conductor 131, break contact of relay RD21 and upper winding of relay CB1 to (+). The upper terminal of the left hand winding of the tone coil may be traced by way of condenser C5, make contact of relay CT2, conductor RFS, break contact of relay SR11, conductor 133, lower left hand winding of coil RC, conductor 134, break contact of relay RD21 and lower winding of relay CB1 to (−). It will be understood that the tone flowing through the lef hand windings of coil RC is induced into the right hand windings of this coil and connected to the toll line over the previously described circuit to which the right hand windings of this repeating coil are connected. It will also be understood that the right hand winding of the tone coil picks the tone off of the incoming sleeve conductor SFS from the sleeve conductor of a paystation line while relay CT2 is operated to include the right hand winding of the tone coil in the holding circuit connected to conductor SFS. Now when relay SR1 operates in response to the answering of the call, the above described circuit to relay CT is opened for effecting the release of this relay and the consequent release of relays CT1 and CT2 by opening up their above described circuits. When relay CT2 is released, direct (+) is again applied to conductor SFS and the left hand winding of the tone coil is disconnected from the toll line circuit for removing the coin box tone.

When the call is answered in the distant office, the talking circuit is completed by way of the toll line conductors, with talking battery being fed to the called line from the connector in the tandem office and with battery being fed to the calling line from the windings of relay CB1 in the C. D. O. repeater.

It will first be assumed that the called party hangs up first. This straightens out the battery connection from the connector in the tandem office for reversing the current flow through the lower winding of relay SR of Fig. 10 for effecting the release of this relay. The release of relay SR opens up and releases relay SR2. The release of relay SR also closes the energizing circuit for lamp MON as an indication to the attendant that the called party has hung up the receiver but that the connection is being held by the calling party, the circuit to the lamp extending from (+), break contact of relay SR, make contact of relay RD21 and lamp MON to (−). Furthermore, the release of relay SR2 straightens out the battery connection to the toll line conductors TL and RL and since the upper winding of relay SR in Fig. 8 is in this toll line circuit, this reversal of current effects the release of relay SR. The release of relay SR opens up and releases relays SR1 and SR11. The release of relay SR of the C. D. O. repeater also lights the monitor lamp in this circuit as an indication that the connection is being held by the calling party after the called party has hung up, this circuit being traced from (+), break contact of relay SR, make contact of relay RD1, conductor 138 and lamp MON to (−). The release of relay SR11 straightens out the battery to the incoming circuit to the C. D. O. repeater for providing supervision and the like in the well known manner. The release of relay SR1 also switches the incoming conductor HSFS from (−) to (+) for supervisory purposes when provided by way of this conductor.

Now when the calling party hangs up the receiver, relay CB1 of the C. D. O. repeater will be released for effecting the release of relay RD1. The release of relay RD1 opens up and releases relay SR12 and this relay in turn opens up and releases relay RD11. The release of relay RD1 opens up the above described circuit to lamp MON for extinguishing this lamp. The release of relay RD11, with relay RD1 released, disconnects (+) from sleeve conductor SFS for effecting the release of the selector, the finder and the line circuit used on the originating connection and for rendering this repeater idle. The release of relay RD11 restores the conductors of the toll trunk to their previously described normal condition so that this trunk is de-energized and the relays at each end of the trunk which are connected thereto are not operated. Relay FS of the C. D. O. repeater is released when relay RD11 releases to open up the above described operating and locking circuits for the FS relay.

When the toll trunk conductors are de-energized, relay CB2 of the repeater in the tandem office is released for effecting the release of the associated RD2 relay. The release of relay RD2 opens up the ring side of the trunk (conductor 212) extending to the incoming selector, for effecting the release of the incoming selector and the connector used in connection with this call. When the selector and connector are released, (+) is disconnected from sleeve conductor 213 for opening up the above described locking circuit, including the lower winding of relay RD21, for effecting the release of this relay. The release of relay RD21 opens up the above described circuit to lamp MON for extinguishing this lamp. This leaves the circuits in normal condition ready for another call.

It will now be described how the circuits operate in case the calling party hangs up while the called party is still on the line. The circuits will be in the talking condition as above described and when the calling party hangs up the receiver, relay CB1 of the repeater in the C. D. O. will be released for opening up and releasing relay RD1. The release of relay CB1 also opens up the toll line trunk for effecting the release of relay CB2 of the repeater in the tandem office and this relay in turn opens up and releases relay RD2. The release of relay CB1 in the C. D. O. repeater closes the previously described circuit for operating relay PC1, this relay closes the previously described circuit for operating relay SH and when relay RD1 is released, the (+) potential is removed from the connection between the two upper windings of the PC1 and PC2 relays, thus effecting the operation of relay PC2 and the locking of relay PC1 through these upper windings. The operation of relay PC2 opens up and releases relay PC1 for in turn opening up and releasing relays PC2 and SH. This operation of the PC2 relay is of no effect at this time because the toll line is now energized through the resistor 13RS. The release of relay CB2 in the tandem office repeater closes the previously described circuit for operating relay PC1 and this relay again operates relay SH. Now when relay RD21 is released (as will next be described) the circuit to (+) for the upper windings of the PC1 and PC2 relays is opened, consequently relay PC2 does not operate. The release of relay PC1 opens up and releases relay SH, this momentary operation of the PC1 relay being of no effect at this time. The operation of relay SH short circuits the operating (upper) winding of relay SR for releasing this relay and this relay in turn opens up and releases relay SR2. The release of relay SR2 straightens out the battery connection to the toll line for reversing the current flow through the lower winding of relay SR of the repeater in the C. D. O. for effecting the release of this relay, which in turn opens up and releases relays SR1 and SR11.

When the toll trunk line is opened up by the release of relay CB1 of the repeater in the C. D. O., and the consequent release of relay RD1, relay SR12 of this repeater is held operated over a circuit which may be traced from (+), lower winding of relay CB2 of the repeater in the tandem office, conductor 126, break contact of relay RD12, upper left hand winding of coil RC, make contact of relay SR2 (or break contact of this relay after it releases as previously described), toll line conductor RL, break contact of relay SR2 of the repeater in the C. D. O., conductor 129, break contact of relay RD1, conductor 130, lower right hand winding of coil RC, make contact of relay RD11, another make contact of relay RD11, upper winding of relay SR12, resistor 13RS, conductor 157, break contact of relay RD1, conductor 141, make contact of relay RD11, upper right hand winding of coil RC, break contact of relay SR2, toll line conductor TL, make contact of relay SR2 of the repeater in the tandem office (or break contact of this relay after it releases), break contact of relay RD12, lower left hand winding of coil RC, break contact of relay RD12, conductor 127 and upper winding of relay CB2 to (−). It will be understood that this same circuit is completed with relay SR2 operated or released, the only difference being that battery flows over the trunk in one direction while the SR2 relay is operated and in the opposite direction when the SR2 relay is released, but the upper winding of relay SR12 is energized in series aiding relation to the lower winding while the battery is reversed over the toll line trunk for holding relay SR12 operated. The high resistance coil 13RS in the toll line trunk at this time is sufficient to allow relay CB2 of the repeater in the tandem office to release as above described. Now when relay SR2 is released in response to the release of relay CB2 which operates relays PC1 and SH, the battery is straightened out to the toll line conductors for reversing the flow of current through the upper winding of relay SR12 of the repeater in the C. D. O. for releasing this relay. Relay SR12 opens up the operating circuit for the RD11 relay and this relay is released after relay SH is released for opening up a locking circuit for relay RD11 which may be traced from (+), break contact of relay TA, conductor 158, make contact of relay SH, conductor 159, make contact and winding of relay RD11 to (−). The release of relay RD11 disconnects (+) potential from sleeve holding conductor SFS for releasing the circuits used in extending the call to this repeater and for rendering the repeater idle.

The release of relay RD1 closes a circuit for again energizing lamp MON which may be traced from (+), make contact of relay RD11, conductor 160, break contact of relay RD1, conductor 138 and lamp MON to (−), this circuit being opened by the release of relay RD11 for extinguishing the lamp. Relay FS of the C. D. O. repeater is released when relay RD11 releases for opening up the above described energizing circuit for the FS relay. This restores the circuits of the C. D. O. repeater to normal and releases the connection extending to this repeater.

Referring to the repeater in the tandem office, the release of the CB2 and RD2 relays, in response to the insertion of the high resistor 13RS in the toll trunk opens up the circuit to the incoming selector, including conductors 211 and 212, for effecting the release of the switches in the tandem office used in extending this call. When the switches release and remove (+) from sleeve conductor 213, the locking circuit for the RD21 relay is opened for effecting the release of this relay. The monitor lamp associated with this repeater is momentarily energized by the release of relay SR over a circuit extending from (+), break contact of relay SR, make contact of relay RD21 and lamp MON to (−), this circuit being opened when relay RD21 releases as above described.

When the switches in the tandem office are released, while the called party is still on the line as in this example, the called line circuit either goes to its locked-out condition (if a line lock-out circuit is provided) or the connector (last party release) is held as long as the called party has the receiver off the hook.

*Tandem office—C. D. O. trunk call*

It will now be explained how the circuits function when a subscriber in the tandem office dials the seventh level (for example) for selecting the 2-way repeater in the tandem office associated with an idle trunk leading to the C. D. O. When the closed circuit of the calling line is extended through the line finder and the first selector to the terminals leading to the 2-way repeater on the tandem office end of the 2-way trunk circuit, relay CB1 of this repeater is operated over a circuit which may be traced from (+), upper winding of relay CB1, conductor 161, break contact of relay RD21, upper right hand winding of coil RC, conductor 163, break contact of relay SR1, tip trunk conductor TB leading back to the local first selector, through the selector, line finder, line circuit and substation in series, back through the line circuit, line finder and first selector to conductor RB, break contact of relay SR1, conductor 164, lower right hand winding of coil RC, break contact of relay RD21, conductor 162 and lower winding of relay CB1 to (−). Relay RD1 is now operated over a circuit extending from (+), make contact of relay CB1, conductor 165 and winding of relay RD1 to (−). The operation of relay RD1 closes a circuit for priming relay SR so that it will be sensitive to current flow through its lower winding, when this flow of current is in the reverse direction, as will be later explained. This priming circuit may be traced from (+), make contact of relay RD1, high resistor 15RS and upper winding of relay SR to (−). Relay RD1 also applies (+) potential to the incoming sleeve conductor SB for holding the preceding switches and for making this trunk busy to other calls. This circuit may be traced from (+), make contact of relay RD1 and conductor SB to the bank terminals of the selector group. A circuit is now closed for operating relay RD11 which may be traced from (+), make contact of relay RD1 and winding of relay RD11 to (−). Relay RD11 closes an obvious circuit for operating relay RD12. The monitor lamp is now lighted as an indication to the attendant that the repeater has been seized by a calling party and that the call has not been answered. The circuit for this lamp extends from (+), break contact of relay SR, make contact of relay RD12 and lamp MON to (−).

The toll line conductors are now energized by way of a circuit which may be traced from (+), winding of impedance coil CB22 of the repeater on the C. D. O. end of this trunk circuit, break contact of relay SH, conductor 128, break contact of relay RD11, upper right hand winding of coil RC, break contact of relay SR2, toll line conductor TL, break contact of relay SR2 of the repeater in the tandem office, upper left hand winding of coil RC, make contact of relay RD12, resistor 16RS, lower winding of relay SR, break contact of relay SH, make contact of relay RD12, lower left hand winding of coil RC, conductor 166, break contact of relay PC2, break contact of relay SR1 and make contact of relay CB1 in multiple therewith, conductor 167, make contact of relay RD1, break contact of relay SR2, toll line conductor RL, break contact of relay SR2 of the repeater in the C. D. O., conductor 129, break contact of relay RD1, conductor 130, lower right hand winding of coil RC, break contact of relay RD11 and winding of relay CB21 to (−). Relay CB21 operates, closes a circuit for operating relay RD2 extending from (+), make contact of relay CB21 and winding of relay RD2 to (−). Relay RD2 makes this trunk busy to outgoing calls from the C. D. O. by applying (+) potential to the sleeve terminals of the selectors which have access to this trunk. This make-busy circuit may be traced from (+), make contact of relay RD2 and terminal SFS to the bank contacts of the above mentioned selectors. The monitor lamp associated with the C. D. O. repeater is now lighted over a circuit which may be traced from (+), break contact of relay SR, conductor 168, make contact of relay RD2 and lamp MON to (−), this being an indication to the attendant in the C. D. O. that the repeater has been seized but the call has not been answered. Relay RD21 of the C. D. O. repeater is now operated over a circuit which may be traced from (+), break contact of relay RD11, make contact of relay RD2, conductor 169 and winding of relay RD21 to (−). The operation of relay RD21 closes a priming circuit for the SR relay of this repeater which may be traced from (+), make contact of relay RD21, high resistor 9RS and lower winding of relay SR to (−). The operation of relay RD21 closes a circuit across the tip and ring conductors leading to the incoming selector associated with the repeater in the C. D. O., including conductors 114 and 115. This circuit may be traced from (+), through a winding of the CB relay (not shown) of this incoming selector, break contact of the selector switching relay SW, conductor 114, make contact of relay RD21, conductor 132, upper left hand winding of coil RC, conductor 131, make contact of relay RD21, upper winding of relay SR, resistor 11RS, make contact of relay RD21, conductor 134, lower left hand winding of coil RC, conductor 133, make contact of relay RD21, break contact of relay PC2 and conductor 115 to the other winding of the CB relay of the incoming selector. The CB relay of the incoming selector operates and closes a circuit for operating the associated RD relay to prepare the selector for receiving the next series of impulses.

It will be assumed that the calling subscriber dials digit 2 to advance the incoming selector in the C. D. O. to the second level for selecting a connector associated with an idle terminal in the selected group. Relay CB1 of the tandem office repeater repeats the impulses from the dial and at the first release of this relay a circuit is closed for operating relay PC1 which may be traced from (+), break contact of relay CB1, conductor 170, make contact of relay RD12, conductor 150, break contact of relay PC2 and upper winding of relay PC1 to (−). Relay PC1 closes a circuit for operating relay SH which may be traced from (+), make contact of relay PC1, break contact of relay SR1, conductor 151 and winding of relay SH to (−). When relay CB1 operates to mark the end of the first impulse, a circuit is closed for operating relay PC2 and for locking relay PC1 which may be traced from (+), make contact of relay RD1, conductor 147, upper winding of relay PC2, make contact of relay PC1, break contact of relay PC2 and upper winding of relay PC1 to (−). It will be understood that this circuit is effective because the circuit to (+) from the break contact of relay CB1 (above traced) connected to the point between the upper windings of the PC1 and PC2 relays, is opened to permit the operation of relay PC2 and the locking of relay PC1. The operation of relay PC2 opens up the above described locking circuit for relay PC1 for effecting the release of this relay. Relay PC2 is locked operated until relay PC1 is released by way of the above described circuit including its upper winding, make contact of relay PC1, make contact and lower winding of relay PC2 to (−). With relays PC1 and PC2 released, the next release of relay CB1 to mark the beginning of the second impulse operates relay PC1 again and when relay CB1 operates to mark the end of the second impulse, relay PC2 is operated, relay PC1 is locked and when relay PC2 operates, the locking circuit for relay PC1 is opened for releasing this latter relay, after which the locking circuit for relay PC2 is opened for releasing the PC2 relay, all in the previously described manner. Since this is the end of the impulse for this digit, relays PC1 and PC2 remain released and relay SH is released, this latter relay being maintained operated during the pulsing of the PC1 relay because of its slow acting characteristics.

During this impulse operation, the tip conductor TL of the toll line is opened at the break contact of the continuity spring combination of relay SH and maintained open until relay SH releases and closes up this break contact. The operation of relay SH also applies (+) potential to the ring conductor RL of the toll line over a circuit which may be traced from (+), break contact of relay SR, break contact of relay RD21, make contact of the continuity spring combination of relay SH, make contact of relay RD12, lower left hand winding of coil RC, conductor 166, break contact of relay PC2, break contact of relay SR1, conductor 167, make contact of relay RD1 and break contact of relay SR2 to conductor RL. It will be seen that the break contact of relay RD12 which is connected to the lower terminal of the lower left hand winding of coil RC opens up the direct connection from toll line conductor RL normally extending to this terminal of this repeating coil winding, so that the break contact of the PC2 relay is inserted in this toll line conductor for impulsing purposes. Consequently, when relay PC2 operates, as above described, to repeat the impulses from relay CB1, the toll line conductor RL is opened for repeating these impulses over a single conductor of the toll line trunk circuit.

Referring now to the repeater in the C. D. O., each opening of toll line conductor RL effects the release of relay CB21, consequently relay CB21 repeats the impulses applied to the toll line conductor RL. When relay CB21 releases to mark the beginning of the first impulse, a circuit is closed for operating relay PC1 which may be traced from (+), break contact of relay CB21, make contact of relay RD2, conductor 148, break contact of relay PC2 and upper winding of relay PC1 to (−). Relay PC1 closes an obvious circuit for operating relay SH. Relay SH short-circuits the upper winding of relay SR, it short-circuits the lower right hand winding of coil RC, thus removing this winding from the toll line conductor, and it connects toll line conductor TL to the lower winding of relay TA to determine if this is a toll call. This connection of toll line conductor TL to the lower winding of relay TA may be traced from conductor TL, break contact of relay SR2, upper right hand winding of coil RC, break contact of relay RD11, conductor 128, make contact of relay SH, conductor 171, make contact of relay RD2 and lower winding of relay TA to (−). Since it is assumed that this is not a toll call, the TA relay will not be operated over this circuit. It will be explained later how relay TA is operated when a call from the toll office is extended by way of the incoming selector associated with the toll-tandem office trunk to the repeater connected to the seventh level of this selector in the tandem office.

When relay CB21 operates to mark the end of the first impulse of this digit, a circuit is closed for operating relay PC2 and for locking relay PC1, this circuit extending from (+), upper winding of relay PC2, make contact of relay PC1, break contact of relay PC2 and upper winding of relay PC1 to (−). When relay PC2 operates, the above described circuit to the upper winding of relay PC1 is opened for effecting the release of this relay. Also, when relay PC2 operates, it is locked operated until relay PC1 is released over a circuit extending from (+), upper winding of relay PC2, make contact of relay PC1, make contact and lower winding of relay PC2 to (−). When relay CB21 releases to mark the beginning of the second impulse of this digit, relay PC1 is again operated and when relay CB21 operates to mark the end of this impulse relay PC1 is locked and relay PC2 is operated. Relay PC2 effects the release of relay PC1 and this latter relay opens up and releases relay PC2, all in the previously described manner. When relay PC1 remains down to mark the end of the impulse of this digit, relay SH releases and removes the short-circuit from the repeating coil and the upper winding of relay SR and switches toll line conductor TL from the TA relay winding back to the winding of impedance coil CB22.

Since the break contact of relay PC2 is in the circuit leading to the incoming selector, including conductor 115, the intermittent operation of the PC2 relay transmits impulses to the CB relay of the incoming selector in accordance with the impulses transmitted from the calling dial and repeated by relays CB21 and PC2 of the C. D. O. repeater. At the end of this series of impulses, the trunk conductors 114 and 115 leading to the incoming selector are closed for a sufficiently long interval to permit the selector to trunk hunt and select an idle connector in the selected group. The remaining digits transmitted from the dial are received and repeated through the repeaters on each end of the toll trunk in the same manner as previously described, these additional impulses being effective to advance the selected connector to the terminals of the wanted line. It is not believed necessary to show or explain the detailed circuits of the connector in the C. D. O., it only being necessary to point out that battery is reversed back to conductors 114 and 115 when the called party answers, this being accomplished in the well-known manner.

When the battery is reversed over trunk conductors 114 and 115, extended through to the connector, relay SR of the C. D. O. repeater is operated, since the upper winding of this relay is included in the circuit extending to the connector. Relay SR closes a circuit for operating relay SR2 extending from (+), break contact of relay SR1, make contact of relay RD21, conductor 172, lower winding of relay SR2, break contact of relay TA, conductor 173, make contact of relay RD21, make contact of relay SR and resistor 20RS to (−). The operation of relay SR also opens up the above described energizing circuit for lamp MON for extinguishing this lamp as an indication to the attendant that the call has been answered. The operation of relay SR2 reverses the battery feed through coils CB21 and CB22 back over the toll line to the tandem office repeater for operating relay SR of this repeater, since its lower winding is included in the toll line circuit. Relay SR closes a circuit for operating relay SR1 extending from (+), make contact of relay SR, make contact of relay RD12, break contact of relay RD2, conductor 174 and winding of relay SR1 to (−). Relay SR1 reverses the battery connection, including the windings of relay CB1, back to the calling line, including conductors RB and TB, for supervisory or metering purposes. Relay SR1 also switches conductor HSB from (+) through the winding of the HS relay to (−) through resistor 17RS. The purpose of this reversal of the battery connection to the HSB conductor will be explained in connection with a call from the toll office, through the tandem office to the C. D. O. Relay SR1 also shunts the PC2 impulse contacts in the tandem office repeater and removes the shunt from the CB1 contacts included in the toll line circuit. The operation of relay SR also opens up the above described energizing circuit for the monitor lamp in this repeater for extinguishing the lamp as an indication to the attendant in this office that the call has been answered. This establishes the talking condition between the calling and the called lines.

It will first be assumed that the called party hangs up first, thus straightening out the battery connection to conductors 114 and 115 of the C. D. O. repeater for effecting the release of relays SR and SR2 of this repeater. Relay SR again closes the circuit to lamp MON as an indication to the attendant in the C. D. O. that the called party has hung up and that the calling party is still on the line. The release of relay SR2 in the C. D. O. repeater straightens out the battery connection over the toll line conductors for effecting the release of relays SR and SR1 in the tandem office repeater. The release of relay SR again energizes lamp MON of the tandem office repeater as an indication to the attendant in this office that the called party has hung up and that the calling party is still on the line. The release of relay SR1 in the tandem office repeater also straightens out the battery connection to the calling line, including conductors RB and TB for supervisory purposes. The release of relay SR1 also switches conductor HSB back to (+) through the winding of relay HS and removes the shunt from the PC2 relay impulse contact, at the same time shunting the make contact of the CB1 relay which is included in the toll line circuit.

When the calling party hangs up, relay CB1 of the tandem office repeater is released for opening up and releasing relay RD1. The release of relay RD1 disconnects (+) from conductor SB for releasing the switches in the tandem office used in connection with this call and for rendering this trunk circuit idle. The release of relay RD1 also opens up and releases relay RD11 and this relay in turn opens up and releases relay RD12. The release of relay RD12 de-energizes the monitor lamp circuit and restores the toll line conductors TL and RL to normal, thus effecting the release of relay CB21 of the repeater in the C. D. O. Relay CB21 opens up and releases relay RD2 and this relay in turn de-energizes the monitor lamp circuit of this repeater and opens up and releases relay RD21. The release of relay RD21 opens up the trunk circuit to the incoming selector, including conductors 114 and 115. This restores the circuits at both ends of the trunk to normal ready for another call.

In the event that the calling party hangs up the receiver while the called party is still on the line, relays CB1, RD1, RD11 and RD12 in the tandem office repeater will be released. The release of relay RD1 disconnects (+) potential from incoming sleeve conductor SB for the purpose previously described. The release of relay CB1 closes the above described operating circuit for relay PC1, this relay operates and closes the above described circuit for operating relay SH. The operation of relay SH opens up toll line conductor TL and applies (+) to toll line conductor RL in the previously described manner. Now when relay RD1 releases, toll line conductor RL is opened for effecting the release of relay CB21 of the C. D. O. repeater and this relay in turn opens up and releases relay RD2.

The operation of relay SH of the tandem office repeater opens up the lower winding of relay SR for effecting the release of this relay, which in turn opens up and releases relay SR1. Now when relay RD12 of the tandem office repeater releases, the circuit to relay PC1 is opened for effecting the release of this relay, which in turn opens up and releases relay SH. Relay PC2 is not operated at this time because, when relay RD12 releases to remove the short-circuit from the upper winding of relay PC2, there is no (+) on the left hand terminal of the upper winding of this relay because relay RD1 has already released to remove this (+) potential.

Referring to the C. D. O. repeater, the release of relay CB21 closes the previously described circuit for operating relay PC1, this relay again operates relay SH and relay SH short-circuits the upper winding of the SR relay for releasing this relay, which in turn opens up and releases relay SR2. When relay RD2 releases, the circuit to relay RD21 is opened for releasing this relay and the previously described circuit for operating relay PC2 and for locking relay PC1 is completed. Now when relay PC2 operates, relay PC1 is released, after which relay PC2 is released and relay SH is released, all in the previously described manner. This places the circuits at each end of the trunk line in normal condition ready for another call, it being understood that the release of relay RD21 in the C. D. O. repeater opens up conductors 114 and 115 for releasing the incoming selector and connector circuits. It will also be understood that the called line circuit, under this condition either goes to a locked out condition or the connector is held in connection with this line, if the connector is of the last party release type.

*Toll office-tandem office-C. D. O. trunk call*

The operator in the toll office plugs into the outgoing trunk jack and dials for causing the repeater in the toll office to repeat the dialled impulses to the repeater on the tandem office end of the toll trunk and this latter repeater operates the associated incoming selector, all in the previously described manner. Since it is assumed that this call terminates in the C. D. O., the toll operator will dial 7 for the first digit for causing the incoming selector to select a trunk in the seventh level leading to the C. D. O. It has already been explained how the repeater on the tandem office end of the toll trunk (Figs. 3 and 4) repeats the impulses received from the toll dial over conductors 111 and 112 of Figs. 3 and 4, these conductors now being extended to conductors TB and RB of the tandem office repeater shown in Figs. 10 and 11. During the dialling of the digits, following digit 7, conductors TB and RD are impulsed for causing relays CB1 and PC2 of the tandem office repeater to receive and repeat these digital impulses to the C. D. O., this repeating operation of the tandem office repeater having been previously described. It has already been explained how conductor HSB is switched from (+) to (—) in the repeater on the tandem office end of the toll trunk, by way of conductor 113 and conductor HSB, for marking this as a toll call. This operates relay HS (Fig. 10) of the repeater on the tandem office end of the tandem office-C. D. O. trunk, which applies a (+) potential to relay RD2 for operating this latter relay, which in turn locks itself operated over a circuit extending from (+), make contact of relay RD2, make contact of relay RD11 and winding of relay RD2 to (—). The operation of relay RD2 cancels the conversation timing feature on a toll call. This latter feature is not a part of the present invention and is not shown. Relay HS of the tandem office repeater also applies (+) to toll line conductor TL over a circuit extending from (+), make contact of relay HS, make contact of relay RD12, upper left hand winding of coil RC and break contact of relay SR2 to conductor TL. This is effective to operate and lock relay TA of the C. D. O. repeater associated with this trunk, the TA relay marking the call in this repeater as a toll call. The circuit for locking relay TA operated may be traced from (+), make contact of relay RD2, make contact and upper winding of relay TA to (—). Relay TA closes a circuit for operating relay SR1, this circuit being closed during the dialling operation and extending from (+), make contact of relay PC2, break contact of relay SR1, conductor 175, make contact of relay TA, conductor 158, make contact of relay SH, conductor 159, make contact of relay TA, conductor 153 and winding of relay SR1 to (—). Relay SR1 closes a locking circuit for itself which may be traced from (+), lowermost make contact of relay SR1 and over the previously described circuit to the winding of this relay. The operation of relay SR1 applies (—) potential to the left hand terminals of relay SR2 over a circuit which may be traced from (—), make contact of relay TA, conductor 176, make contact of relay SR1, make contact of relay RD21, conductor 172, to the left hand terminals of the SR2 relay. This energizes the upper winding of relay SR2, the lower winding being energized at this time over a circuit which may be traced through the make contact of relay TA, conductor 177, through the HS wiper and conductor of the incoming selector to the HS trunk extending to the connector. The same connector shown in Figs. 5 and 6 may be used in the C. D. O., consequently this HS conductor extends to (+) through the upper winding of the TL relay of the connector to (+) at a break contact of relay AA. This operates relay TL of the connector to mark this call as a toll call, the detailed operation of a connector of this type being later explained in connection with the connector operation in the tandem office. Relay SR2 of the repeater in the C. D. O. does not operate under this condition because both of its windings are energized in opposition as indicated by the arrows associated with the windings of this relay.

When the call is answered in the C. D. O., relay SR of the repeater in this office is operated in response to the reversed battery in the previously described manner. A different circuit is closed this time for operating relay SR2 and may be traced from (—) at a make contact of relay RD of the connector, make contact of relay AA of the connector (operated when the call is answered) upper winding of relay TL of the connector, conductor HS and thence through the incoming selector circuit by way of the incoming selector, wiper HS, and make contact of relay SW, conductor 177, make contact of relay TA, lower winding of relay SR2, conductor 172, make contact of relay RD21, make contact of relay SR1, conductor 176 and make contact of relay TA to (—). It will be seen that this circuit effectively short-circuits the lower winding of relay SR2 so that the current through its upper winding is effective to operate the relay. The operation of relay SR2 reverses the trunk line conductors TL and RL for causing a reverse current flow through the winding of relay SR of the repeater in the tandem office for operating this relay. Relay SR does not operate relay SR1 at this time because its circuit is opened at the innermost lower break contact of relay RD2. It will now be explained how relay RD2 is operated in connection with a call of this class. Relay HS of the tandem office repeater (Fig. 4) is operated because conductor HSB connected to conductor 113 of the repeater on the tandem office end of the toll trunk by way of the incoming selector is switched from (+) to (—) during dialling, as previously described. This upsets the balance of relay HS of the tandem office repeater since its lower winding is connected to (+) before the call is answered at the uppermost break contact of relay SR. Consequently, relay HS operates during dialling on a toll call for operating relay RD2 and for locking it over the previously described circuit.

The operation of relay HS also applies (+) by way of its uppermost make contact and upper left hand winding of coil RC to toll line conductor TL for operating relay TA in the C. D. O. repeater. The operation of relay RD2 in the tandem office repeater also opens up the circuit to relay SR1 so that the answered call will not be effective to reverse battery back to the calling line. Relay HS of the tandem office repeater does not operate when the call is answered because of its differential connection and because (+) potential is connected to its upper winding by way of conductor HSB when relay SR operates to apply (—) to the left hand terminals of both windings. Relay HS in the repeater on the tandem office end of the toll trunk does operate, however, when the call is answered and (—) is applied back over conductor HSB because at this time the lower winding of the HS relay on this toll trunk repeater is short-circuited. Consequently, relay HS of the toll trunk repeater (Fig. 4) operates to provide "off hook" supervision in the previously described manner. It is not believed necessary to explain the release operations in connection with a call of this class, since these operations are controlled in the previously described manner.

*C. D. O.-tandem office-toll office trunk call*

Figure 4:
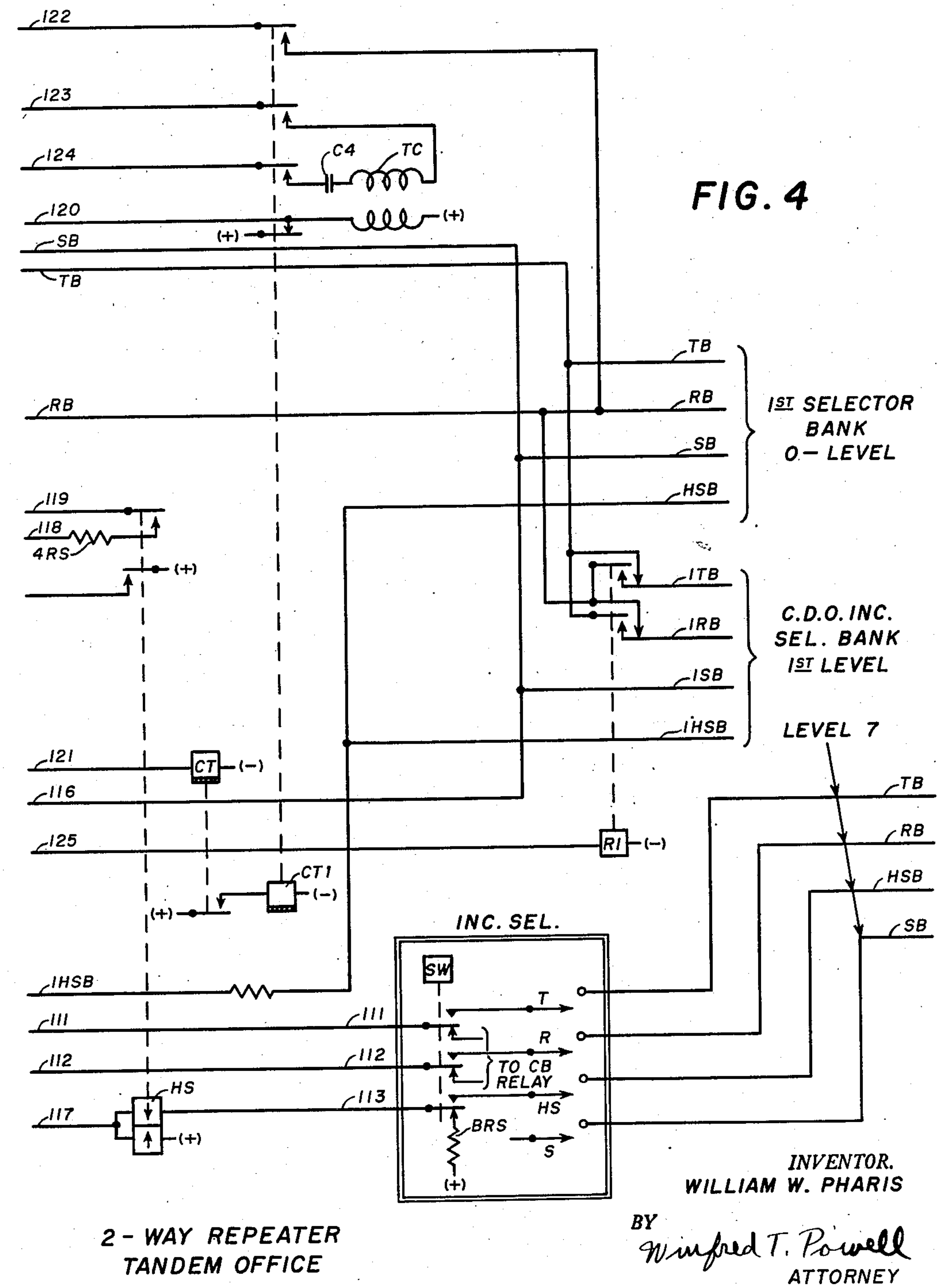

It has already been described how the repeater of Figs. 3 and 4 operates on a call from a subscriber in the tandem office to the toll operator in the toll office. This tandem office-toll office trunk call is effective when a local first selector in the tandem office selects the 2-way repeater on the trunk to the toll office by way of terminals TB, RB, SB and HSB shown in the right hand portion of Fig. 4. On this call, the battery from the windings of relay CB of Fig. 3 is not reversed back to the calling subscriber, the reversing contacts of relay RV not being included in these trunk conductors. Relay RV operates, however, when the call is answered by the toll operator for effecting the operation of relays PL and RD2, the latter relay closing an obvious circuit for operating relay RV by way of conductor 125. The battery is not reversed to a calling line on a call of this class because it is a free service call and the meter or coin box associated with the line should not be operated on a call to toll.

On a call from the C. D. O. to the toll office by way of the tandem office, the repeater on the C. D. O. end of the C. D. O.-tandem office trunk automatically sends one impulse to step the incoming selector associated with the repeater on the tandem office end of this trunk to the first level, as previously explained. The sleeve and HS conductors 1SB and 1HSB of the first level of the incoming selectors are directly connected to the associated sleeve and HS conductors SB and HSB of the tenth level associated with the local first selectors. The line conductors 1TB and 1RB from the first level of the incoming selector are connected through reversing contacts of the RV relay to the associated line conductors TB and RB of the tenth level bank terminals of the local first selector. Referring to Figs. 7, 8 and 9, it will now be explained how this single impulse is generated in the repeater in the C. D. O. when this repeater is selected from level 0 (for example) on a toll call. The tenth level terminals of the first selector in the C. D. O. connect to the repeater by way of terminals TTA, RTA, STA and HSTA shown in the upper left hand portion of Fig. 7. Consequently, when these terminals are selected, the closed circuit across the calling line operates relay CB1 of the repeater in the C. D. O. over a circuit which may be traced from (+), upper winding of relay CB1, break contact of relay RD21, conductor 131, upper left hand winding of coil RC, conductor 132, break contact of relay SR11, conductor TFS, conductor TTA and thence by way of the first selector, line finder, line and substation circuits in series back to conductor RTA, break contact of relay TD2, upper winding of relay TD1, break contact of relay TD2, break contact of relay FS, conductor RFS, break contact of relay SR11, conductor 133, lower left hand winding of coil RC, conductor 134, break contact of relay RD21 and lower winding of relay CB1 to (—). Relay TD1 is operated in this circuit. Relay CB1 closes the previously described circuit for operating relay RD1 and this latter relay applies (+) potential to the incoming sleeve conductors for making this trunk busy and for holding purposes, all as previously described. The monitor lamp is controlled in the previously described manner, it not being necessary to repeat this description at this time. Relays SR12 and RD11 are operated by way of the previously described circuits. Relay FS is not primed or operated at this time because the circuit to its winding is open at a break contact of relay TD1, now operated, and at a break contact of relay TD2, later operated.

Relay CT is now operated over a circuit extending from (+), make contact of relay RD11, conductor 143, break contact of relay SR1, conductor 144, make contact of relay TD1, break contact of relay TD2 and winding of relay CT to (—). Relay CT1 is now operated over a circuit extending from (+), make contact of relay RD11, conductor 143, conductor 135, make contact of relay CT and winding of relay CT1 to (—). An obvious circuit is now closed for operating relay CT2. The toll line conductors are energized when relay RD11 operates, this energizing circuit being previously described in connection with a C. D. O.-tandem office call. The operation of relay CT2 short-circuits the upper winding of relay TD1 for effecting the release of this relay. Before relay TD1 is released, a circuit is closed for operating relay PC1 which may be traced from (+), make contact of relay RD11, conductor 143, conductor 135, make contact of relay CT1, break contact of relay FS, break contact of relay TD2, conductor 148, break contact of relay PC2 and upper winding of relay PC1 to (—). Relay PC1 closes an obvious circuit for operating relay SH. When relay TD1 releases, the above described operating circuit for relay CT is opened and this relay releases for closing a circuit for operating relay TD2 extending from (+), make contact of relay RD11, conductors 143 and 135, break contact of relay CT, make contact of relay CT1, break contact of relay FS and winding of relay TD2 to (—). Relay TD2 locks itself operated to this (+) contact at relay RD11. The operation of relay TD2 closes the above described energizing circuit for again operating relay CT. Relay CT does not remain released for a sufficiently long period to permit relay CT1 to release and consequently relay CT2 is not released. It will thus be seen that this momentary operation of relay CT is effective to cause the operation of relay PC1, this arrangement being effective to set the circuit for providing the single generated impulse.

The operation and locking of relay TD2 opens up the operating circuit for relay TD1 and extends the incoming ring conductor RTA directly to the contact of relay SR11, thus removing the winding of the TD1 relay from the incoming line circuit. This operation of relay TD2 therefore prevents another operation of relay TD1 for consequently preventing the generation of another impulse, thus limiting this impulse generation to a single digit of a single impulse. The operation of relay TD2 also opens up the circuit to the winding of relay SR11 to prevent the operation of this relay and the consequent battery reversal back to the calling line when the toll operator answers, it being understood that this is a call which must not effect the operation of a meter or a coin box associated with the calling line.

When relay TD2 operates, the above described circuit from (+) to the upper winding of relay PC1 is opened for effecting the operation of relay PC2 and the locking of relay PC1 over a circuit which may be traced from (+), upper winding of relay PC2, make contact of relay PC1, break contact of relay PC2 and upper winding of relay PC1 to (—). When relay PC2 operates, it opens the circuit to relay PC1 for effecting the release of this relay and a locking circuit is closed for relay PC2 extending from (+), upper winding of relay PC2, make contact of relay PC1, make contact of relay PC2 and lower winding of relay PC2 to (—). When relay PC1 releases, after a comparatively long time interval due to the short-circuiting of its lower winding, the locking circuit for relay PC2 is opened for effecting the release of this relay. The release of relay PC1 also opens up and releases relay SH. This single operation of relay PC2 opens the toll line circuit at its uppermost break contact for applying one impulse to the repeater at the tandem office end of the trunk. It has already been described how the incoming selector associated with the repeater in the tandem office is operated by impulses received over the toll line and repeated by the tandem office repeater. This sets the incoming selector on a terminal associated with an idle trunk leading to the toll office, the repeater of such a trunk being illustrated in Figs. 3 and 4.

When the call in answered by the toll operator, relays PL and RD2 of the repeater on the tandem office end of the trunk to the toll office are operated as previously described and relay RD2 closes an obvious circuit for relay RV which reverses the battery to the repeater on the tandem office end of the C. D. O.-tandem office trunk. This operates relay SR of the repeater shown in Fig. 10, this latter relay operating the associated SR2 relay for reversing the toll line conductors. This effects the operation of relay SR of the repeater shown in Figs. 7, 8 and 9 but, as previously pointed out, relay SR11 of this repeater does not operate, consequently the battery is not reversed to the calling line, thus cancelling the meter or coin box operation.

The CT, CT1 and CT2 relays of the repeater shown in Fig. 7 are in their operated positions and function in the previously described manner for transmitting a coin box tone to the toll operator if the calling line in the C. D. O. is a paystation line. The circuit operation during the talking condition and the release operation of the various circuits used in this connection are all effected in the previously described manner, it being understood that the release of relay RD2, when the toll operator takes down the connection, effects the release of relay RV.

There is a third path to the repeater in the C. D. O., shown in Figs. 7, 8 and 9, including conductors ST, HST, TT and RT. It is not necessary to describe in detail how the repeater operates when seized over this third path, it only being necessary to point out that the sleeve ST and control HST conductors are multipled with corresponding conductors of the other paths, while the tip and ring conductors TT and RT connect directly to the left hand windings of coil RC and thence to the windings of relay CB1. This by-passes the incoming line conductors around the reverse battery contacts of relay SR11, consequently the operation of the repeater will be the same as previously described except that the battery will not be reversed to the calling line when the call is answered. Such a path is useful and desirable in completing toll connections by way of another selector level instead of the one illustrated in Fig. 1. For example, this repeater might be used in a C. D. O. where the toll office is selected by dialling 110 instead of 0.

*Connector operation*

When the calling party dials the proper digit or digits for causing the local first selector or the incoming selector to extend the call to the connector circuit (Figs. 5 and 6), the closed circuit across the calling line, or in the repeater, operates relay CB of the connector circuit, this circuit being traced from (+), upper winding of relay CB, break contact of relay AB, tip conductor T, through the selector, finder and line circuits, by way of the calling substation (or repeater) and back over conductor R, break contact of relay AB and lower winding of relay CB to (—). Relay CB closes a circuit for operating relay RD which may be traced from (+), break contact of connector release magnet Z, make contact of relay CB and winding of relay RD to (—). The operation of relay CB also closes a circuit for lighting monitor lamp MON extending from (+), break contact of relay AB, make contact of relay CB and lamp MON to (—), it being understood that this circuit to (—) may lead to a common relay which is connected to other monitor lamps for controlling a common signal or the like.

The operation of relay RD applies (+) potential to incoming sleeve conductor S for making this connector busy and for holding purposes in the well known manner. Relay RD also applies (+) potential to master ground conductor MG for controlling and locking purposes as will be later described. X delay relay XD is now operated over a circuit which may be traced from (+) on conductor MG, X off normal break contact 2XON, and lower winding of relay XD to (—). Relay YD is also operated at this time over a circuit extending from (+) on conductor MG, Y off normal contact 2YON, conductor 11 and lower winding of relay YD to (—). Relay PD is likewise operated at this time over a circuit extending from (+) on conductor MG, minor switch off normal contact 2MON, conductor 12 and lower winding of relay PD to (—). Relay PD closes an obvious circuit for operating relay PH.

In this description, it will be assumed that this is a selector type system, consequently no dial tone circuit is required in the connector, the dial tone being supplied in the first selector of the switch train. The calling subscriber now dials the first or tens digit into the connector for effecting the step by step operation of the connector switch in its X or primary direction. It will be assumed that the tens digit comprises one impulse, consequently relay CB will be released once to repeat this impulse and will then remain energized until the next digit is dialled. The release of relay CB opens up the above described circuit for relay RD, but this relay is not released because of its slow acting characteristics. The release of relay CB also opens up the monitor lamp circuit, thus flashing this lamp as an indication that dialling is taking place on the connector. The release of relay CB also closes a circuit for operating stepping magnet X which may be traced from (+), break contact of relay PD, make contact of relay YD, make contact of relay XD and winding of magnet X to (—). It will be seen that magnet X is connected in multiple with the upper winding of relay XD, thus providing a circuit for energizing relay XD at each impulse of the tens series for holding this relay operated until the tens digit series of impulses is terminated, at which time relay XD is released. The original energizing circuit for relay XD is opened when the switch takes its first X step. Since it was assumed that one impulse was transmitted for the tens digit, the swich is advanced to the first level where it awaits the units digit. As soon as the switch takes its first step off normal, start conductor ST is energized over a circuit extending from (+), break contact of relay AB, X off normal contact 3XON and common start conductor ST, this circuit being for the purpose of starting up the ringing and tone machines if such start operation is provided in the system.

It will be assumed that the units digit comprises one impulse, consequently relay CB will repeat this one impulse to the Y or secondary stepping magnet over a circuit which may be traced from (+), break contact of magnet Z, break contact of relay CB, make contact of relay RD, make contact of relay PD, make contact of relay YD, break contact of relay XD, conductor 13 and winding of stepping magnet Y to (—). It will be noted that the upper winding of relay YD is connected by way of a make contact of this relay in multiple with magnet Y. Consequently relay YD will be locked operated during the Y stepping operation and will then be released shortly after this stepping operation is terminated. The original operating circuit of relay YD is opened when the switch takes its first Y step.

This advances the connector to the terminal of the called line. The station digit is now dialled and it will be assumed that this digit comprises one impulse, thus effecting the single release of relay CB for operating minor switch stepping magnet MX over a circuit which may be traced from (+), break contact of magnet Z, break contact of relay CB, make contact of relay RD, make contact of relay PD, break contact of relay YD, conductor 14 and winding of magnet MX to (—). It will be noted that the upper winding of relay PD is connected in multiple with magnet MX, consequently relay PD will be maintained operated during the transmission of the station digit because of its slow acting characteristics and will be released shortly after the termination of this digit. The release of relay PD opens up and releases relay PH. It will be understood that relay RD is held energized during the transmission of the units and station digits because its circuit is not opened for a sufficiently long period of time to permit it to release. Furthermore, the above described circuit to lamp MON is intermittently energized during impulsing of the units and station digits.

The called line is now tested to determine whether it is idle or busy. This test is made by connecting sleeve wiper SW, which is in contact with the sleeve terminal of the called line, to busy test relay BT during the interval between the release of relay PD and the release of PH. This circuit may be traced from wiper SW, conductor 15, break contact of relay PD, make contact of relay PH, conductor 16, break contact of relay SW and winding of relay BT to (—). When relay PH releases, this test circuit to the winding of the BT relay is opened. It will first be assumed that the called line is idle, consequently, no (+) potential will be found on the terminal to which wiper SW is connected so that relay BT will not be energized. Now when relay PH is released, a circuit is closed for operating switching relay SW which may be traced from (+), make contact of relay RD, conductor 17, break contact of relay BT, lower winding of relay SW, conductor 18, break contact of relay PH, break contact of relay PD, conductor 15, wiper SW and associated terminal and winding of the cut off relay of the called line to (—). Relay SW is operated over this circuit and closes a locking circuit for itself extending from (+) on conductor MG, X make contact and upper winding of relay SW to (—). The operation of relay SW connects direct (+) to wiper SW for applying a direct (+) potential to the sleeve terminal of the called line for making this line busy and for operating the cut off relay.

The operation of relay SW connects intercept wiper INTC of the minor switch to the HSW wiper of the connector for controlling the intercept circuit. Since this particular intercept circuit arrangement has been disclosed in a prior application and is not a part of the present invention, its operation will not be explained. The operation of relay SW connects ring back tone to the calling subscriber as an indication that the called line has been selected and is being rung. This circuit may be traced from the source of ring back tone RBT, condenser C3, make contact of relay SW, break contact of relay RT, conductor 19, talking condenser C2 and break contact of relay AB to the ring side of the calling line.

The operation of relay SW also closes a circuit for again operating relay XD extending from (+), make contact of relay SW, break contact of relay RT, conductor 20, break contact of relay XD, Y off normal contact 3YON and lower winding or relay XD to (—). Relay XD closes a locking circuit for itself which may be traced from (+) on conductor MG, break contact of relay RT, conductor 21, make contact of relay XD, Y off normal contact 3YON and lower winding of relay XD to (—). Although the circuit just described for operating relay XD extends from direct (+) at a make contact of relay SW, it will be understood that a pick-up (+) pulse may be substituted for this direct (+) in a code ringing system to make certain that the ringing of the called station is not started during a code ringing interval but must wait until the beginning of this interval as marked by the application of this pick-up pulse. Consequently, in a code ringing system, the XD relay serves the additional purpose of a pick-up relay.

In the event that the station digit comprises six or more impulses, relay BT will be operated for reversing the connection of the ringing generator to the called line, thus this BT relay serves as a reversing relay in a divided circuit ringing system. The contacts of the BT relay reverse the generator circuit to the called line, this circuit being pointed out in detail in connection with the application of the ringing signal to the line on the present call. The circuit for operating relay BT may be traced from (+) on conductor MG, break contact of relay RT, minor switch reversing wiper RV, make contact of relay SW and winding of relay BT to (—). In this example it was assumed that the last digit was 1 (less than 6) consequently, relay BT is not operated over the above described circuit. The ringing circuit may be traced from the selected source of interrupted generator, by way of the terminal and wiper GEN of the minor switch (set by the station digit), conductor 22, make contact of relay XD, conductor 23, lower winding of relay RT, conductor 24, break contact of relay TL, conductor 25, break contact of relay BT, break contact of relay RT, make contact of relay SW, wiper RW and terminal, over the called line and substation circuits in series, terminal and wiper TW, make contact of relay SW, break contact of relay RT and break contact of relay BT to (+). It will be obvious that selective ringing may be applied to the called line by the selection of any one of five different harmonic ringing sources for ringing over the ring side of the line in the present example, or for ringing over the tip side of the line if relay BT is operated as above described.

When the called party answers, the closed direct current path across the called line operates relay RT by way of its lower winding included in the above described ringing circuit. This relay operates only one step in response to the answering of the called party and closes its X contact only. A circuit is now closed for again operating relay YD which may be traced from (+) on conductor MG, minor switch off normal contact 2MON, break contacts of relays TA and TL in multiple, conductor 29, break contact of relay RT, X make contact of relay RT, conductor 26, break contact of relay TL and lower winding of relay YD to (—). The operation of relay YD closes a circuit for energizing the upper winding of relay RT for fully operating this relay, this circuit being traced from (+) on conductor MG, minor switch off normal contact 2MON, conductor 27, make contact of relay YD, conductor 28 and upper winding of relay RT to (—). Relay RT locks itself operated over the above described circuit including conductors MG and 29 by way of its continuity and make contact. The complete operation of relay RT opens up the above described circuits to the XD and YD relays for effecting the release of these relays. The closed circuit across the called line is now extended by way of make contacts of the RT relay to the windings of the AB relay for operating this relay, this circuit being traced from the tip side of the called line, wiper TW, make contact of relay SW, make contact of relay RT, conductor 30, upper winding of relay AB, conductor 31 and make contact of relay SW to (+). The ring side of the called line extends through wiper RW, make contact of relay SW, make contact of relay RT, another make contact of relay SW, conductor 32 and lower winding of relay AB to (—). The called line and the calling line conductors are connected together through condensers C1 and C2 to provide a conversational circuit. The operation of relay AB closes a circuit for operating relay AA which may be traced from (+), make contact of relay AB, conductor 33, make contact of relay SW, conductor 34 and winding of relay AA to (—). The operation of relay AB reverses the battery back to the calling line for supervisory purposes. The operation of relay AA switches the incoming HS conductor from (+) to (—), through the upper winding of relay TL for supervision, if and when provided on the HS conductor. The operation of relay AA closes a circuit to the winding of relay BT extending from (+), make contact of relay YD, make contact of relay AA, conductor 35 and winding of relay BT to (—), this circuit being opened when relay YD is released, thus relay BT is only momentarily operated and performs no function at this time. It will be seen that the operation of relay AB opens up the above described circuit to lamp MON for extinguishing this lamp. The momentary operation of relay BT again energizes the lamp circuit momentarily and when relay BT is released the lamp is extinguished.

Conversation over the established connection now takes place and it will be first assumed that the called party hangs up first. This opens up and releases relay AB for opening up and releasing relay AA. The release of relay AB again closes the circuit for lighting lamp MON as an indication that the called party has hung up but the calling party is still on the line. The release of relay AB straightens out the battery supply to the calling line for supervisory purposes and the release of relay AA switches incoming conductor HS back to (+) for supervision over this HS conductor when provided.

When the calling party hangs up, relays CB and RD are released. The release of relay CB extinguishes lamp MON and the release of relay RD disconnects (+) from the incoming sleeve conductor S and from master ground conductor MG. This de-energization of conductor MG opens up and releases relays SW and RT, the release of relay SW removing (+) from wiper SW. The release of relay SW closes an energizing circuit for the XY switch release magnet Z and for the minor switch release magnet MZ, this circuit being traced from (+), break contact of relay RD, conductor 36, break contact of relay SW, conductor 37, X and Y off normal contacts 1XON and 1YON in multiple and winding of magnet Z to (—). Magnet MZ is connected in multiple with this circuit by way of minor switch off normal contact 1MON for energizing the MZ magnet. These magnets release their respective switches and when these switches are restored to normal, the above described circuits are opened for de-energizing the magnets. The operation of magnet Z applies (+) potential to incoming sleeve conductor S for protecting the associated connector against seizure while the release operation is taking place.

It will now be explained how the connector operates when the calling party hangs up first, following the establishment of a talking connection. Referring to the previous description, it will be recalled that, during a talking connection relays CB, RD, SW, RT, AB and AA are in their operated positions, with relays XD, YD, PD, PH and BT in their released positions. Furthermore, at this time, lamp MON is de-energized, the incoming sleeve conductor S and the master ground conductor MG are energized. The SW wiper is connected to (+) at a make contact of relay SW. Under this condition, when the calling party hangs up, relay CB is released in response to the opening of the calling line circuit and this relay in turn opens up and releases relay RD. The release of relay RD removes (+) from incoming sleeve conductor S for effecting the release of the selector, the finder and the line circuit connected to this particular connector. Following the release of relay RD, (+) is maintained on conductor MG at a make contact of relay AA. The release of relay RD closes a circuit for operating relay YD which may be traced from (+), break contact of relay RD, make contact of relay AA and lower winding of relay YD to (—). Relay YD closes a circuit for operating relay BT extending from (+), make contacts in series of relays YD and AA, conductor 35 and winding of relay BT to (—). Relay BT applies (+) to incoming sleeve conductor S for guarding the connector against seizure over a circuit which may be traced from (+), make contacts of relays YD and AA, conductor 35 and make contact of relay BT to conductor S. The monitor lamp is again energized over a circuit extending from (+) at a make contact of relay BT and conductor 38 to the lamp circuit to provide a visual indication that the connector is being held by the called party.

Now when the called party hangs up, relay AB is released by the opening of the called line circuit and this relay in turn opens up and releases relay AA. Relay AA removes (+) from conductor MG for de-energizing and releasing relays YD, SW, BT and RT. The release of relay AA also opens up the above described energizing circuit for incoming sleeve conductor S, but this conductor is immediately re-energized when connector release magnet Z is operated over a circuit extending from (+), break contact of relay RD, conductor 36, break contact of relay SW, conductor 37, X and Y off normal contacts 1XON and 1YON in multiple and winding of magnet Z to (—). Since minor switch magnet MZ is connected in multiple with magnet Z, the minor switch is also released at this time. When each of these switches is restored to normal, the associated release magnet is de-energized for restoring the connector and minor switch circuits to their normal positions ready for use on another call. The monitor lamp MON is de-energized by the release of relay BT.

It will now be explained how the circuits operate when the called line is busy. Following the station digit, during the interval between the release of relay PD and the release of relay PH, the called line test is made as previously described. (+) potential is found on the sleeve terminal when a busy line is called, this potential effecting the operation of relay BT over a circuit which may be traced from (+) on the terminal in contact with sleeve wiper SW, conductor 15, break contact of relay PD, make contact of relay PH, conductor 16, break contact of relay SW and winding of relay BT to (—). Relay BT operates and locks itself operated when relay PH releases, by way of a circuit extending from (+), make contact of relay RD, conductor 17, make contact of relay BT, conductor 39, break contact of relay PH, conductor 16, break contact of relay SW and winding of relay BT to (—). The operation of relay BT opens up the lower winding of relay SW to make sure this relay does not operate during this call. Busy tone is connected to the calling line over a circuit which may be traced from the source of busy tone, break contact of relay PH, conductor 40, make contact of relay BT, break contact of relay SW, conductor 31, upper winding of relay AB, condenser C1, break contact of relay AB and over the calling line and substation circuits in series. Flash busy is also effective by means of the intermittent operation of relay AA over a circuit extending from common interrupter INT, break contact of relay PH, conductor 41, make contact of relay BT, break contact of relay SW, conductor 34 and winding of relay AA to (—). The intermittent operation of relay AA switches incoming conductor HS from (+) at the break contact of relay AA to (—) at the make contact of relay RD for providing a busy flash signal by way of conductor HS to a trunk circuit which may be used in a call to a busy line. When the calling party hangs up the receiver, following the receipt of the busy signal, relays CB and RD are released for effecting the release of the connector switch and circuits in the previously described manner.

It will now be explained how the P. B. X hunting feature of the connector operates. In this case, the busy test is made between the release of relay PD and the release of relay PH so that relay BT will be operated as previously described, if the first line of the P. B. X group is busy when selected. The conductor to which wiper HSW is connected for the first line of the P. B. X group is connected to (+) and the HSW and SW contacts associated with the last line of the P. B. X group are tied together through a comparatively high resistance, for example, 4,000 ohms.

This (+) potential on the first HSW terminal of the P. B. X group closes a circuit by way of wiper HSW, conductor 42, break contact of relay PD, make contact of relay PH, conductor 43, break contact of relay HT, resistor 1RS and winding of relay HT to (—). Relay HT is operated and locked over a circuit extending from (+) on conductor MG, X make contact of relay HT, resistor 1RS and winding of relay HT to (—). Resistor 2RS connected through a break contact of relay HT to the above described operating circuit for relay HT is for timing the operation of this relay. A circuit is now closed for operating relay HA which may be traced from (+) on conductor MG, make contact of relay PH, conductor 44, make contact of relay BT, make contact of relay HT, break contact of magnet Y and upper winding of relay HA to (—). This same circuit clocks relay PH over a circuit which may be traced from (+) on conductor MG, over the above described circuit to the winding of relay HA and thence by way of conductor 45, break contact of relay PD and winding of relay PH to (—). Consequently, when the first terminal of the P. B. X group is found busy, relays BT, HT, HA and PH are operated.

The Y magnet is now energized over a circuit which may be traced from (+) on conductor MG, make contact of relay HA and winding of magnet Y to (—). The operation of the Y magnet opens up the above described circuit to the HA and PH relays for effecting the release of relay HA, relay PH not being released because of its slow acting characteristics. The release of relay HA opens up the above described operating circuit for the Y magnet for releasing this magnet. If wiper SW is now is contact with another busy terminal, (+) on this terminal will be effective to hold relay BT operated for again energizing relay HA and for locking relay PH over the above described circuits. The energization of relay HA again energizes the Y magnet for causing the switch to take another step. This intermittent operation of the HA relay and the Y magnet continues as long as relay BT is energized, this relay being energized as long as a busy trunk is tested and the PH relay being energized as long as relay BT indicates a busy trunk being tested.

When the idle line of the group is reached, there is no (+) on wiper SW for holding relay BT, this relay releases and opens up the above described circuit for relays HA and PH, thus preventing the operation of the HA relay and permitting relay PH to release. This stops the Y stepping operation and when relay PH is released, the circuit to relay SW is closed for operating and locking this relay as previously described. This seizes the called line, ringing is applied to this line and the talking circuit is established, all in the previously described manner.

In the event that the last line in the P. B. X group is busy when relay HA operates to energize the Y magnet for stepping the switch on to the terminals of this line, relay HA is held operated over a circuit which may be traced from (+) on the sleeve terminal of the busy line, through the resistance which bridges the SW and HSW terminals of the last line of the P. B. X group, terminal and wiper HSW, conductor 42, break contact of relay PD, make contact of relay PH, conductor 43, make contact of relay HT, make contact of relay BT and lower winding of relay HA to (—). Relay PH is locked operated at this time over its previously described locking circuit. This holds relay HA and magnet Y energized until relay PH releases and opens up the circuit to the HA relay. Relay PH is released (after a slight delay) because its operating circuit is held open at the break contact of the Y magnet. The release of relay PH opens up and releases relay HA, relay HT remaining locked operated and relay BT now being locked operated over a circuit extending from (+), make contact of relay RD, conductor 17, make contact of relay BT, conductor 39, break contact of relay PH, conductor 16, break contact of relay SW and winding of relay BT to (—). This places the circuits in the same condition previously described in connection with a call to a busy line for preventing the operation of the SW relay, for applying the flash busy and the busy tone to the calling line. Relay HT remains locked over the previously described locking circuit but the operation of this relay at this time is of no effect.

It will now be explained how the circuits operate in connection with a toll call. When the operator sets up the connection by way of the trunk circuit and the associated repeater and incoming selector in the tandem office for selecting the connector illustrated in Figs. 5 and 6, the closed circuit across the incoming T and R conductors to the connector effects the operation of relay CB, after which relays RD, XD, YD, PD and PH are all operated in the previously described manner. Similarly, monitor lamp MON, incoming sleeve conductor S and master ground conductor MG are energized as previously described.

Figure 5:
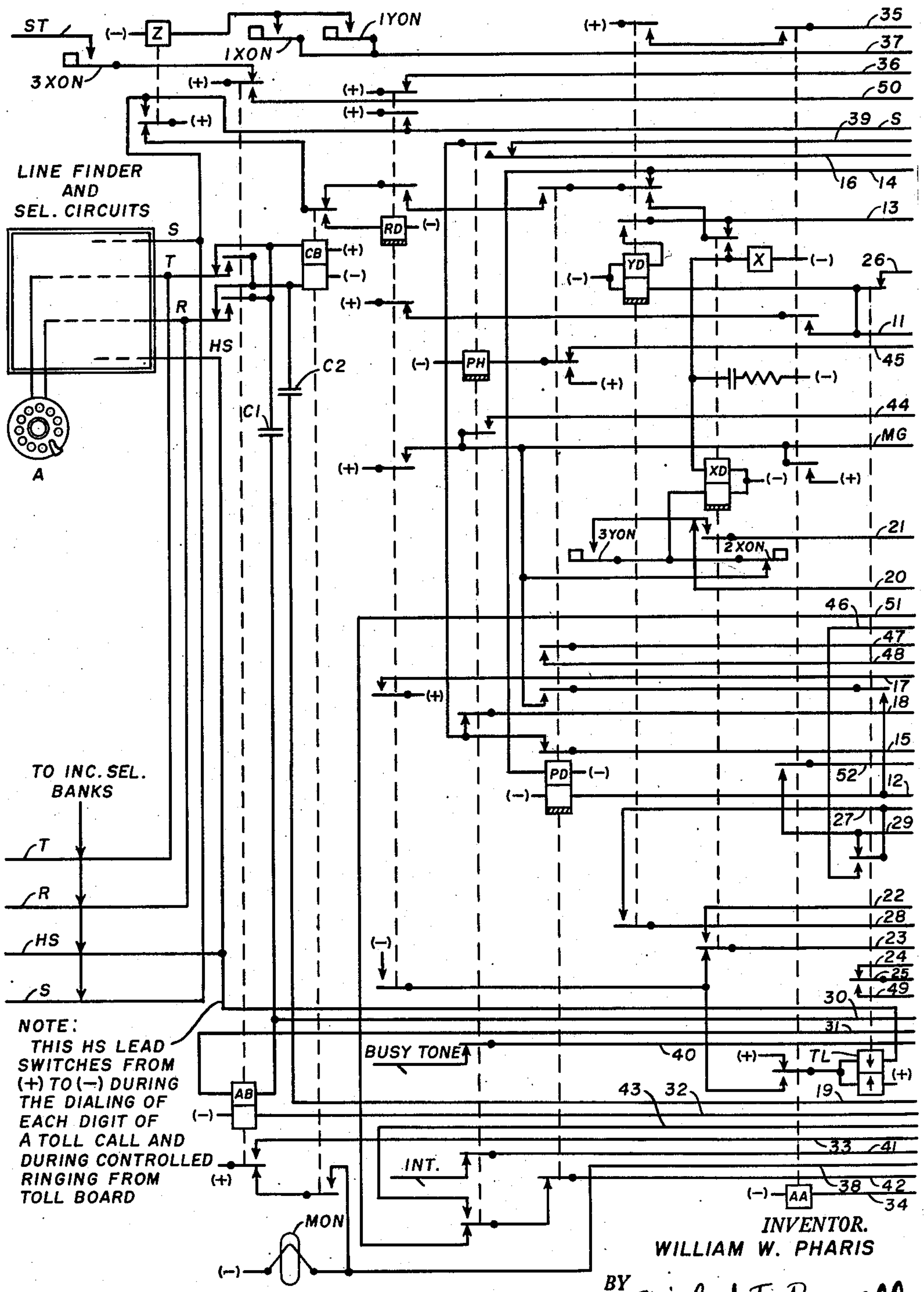
Figs. 5 and 6 are circuit diagrams of the combination local and toll connector in the tandem office for providing the necessary circuit operations in a connector of this type. The new and novel features of this connector circuit are claimed in the co-pending application of Kessler and Frankel, Serial No. 139,701, filed January 20, 1950.
Figure 6:
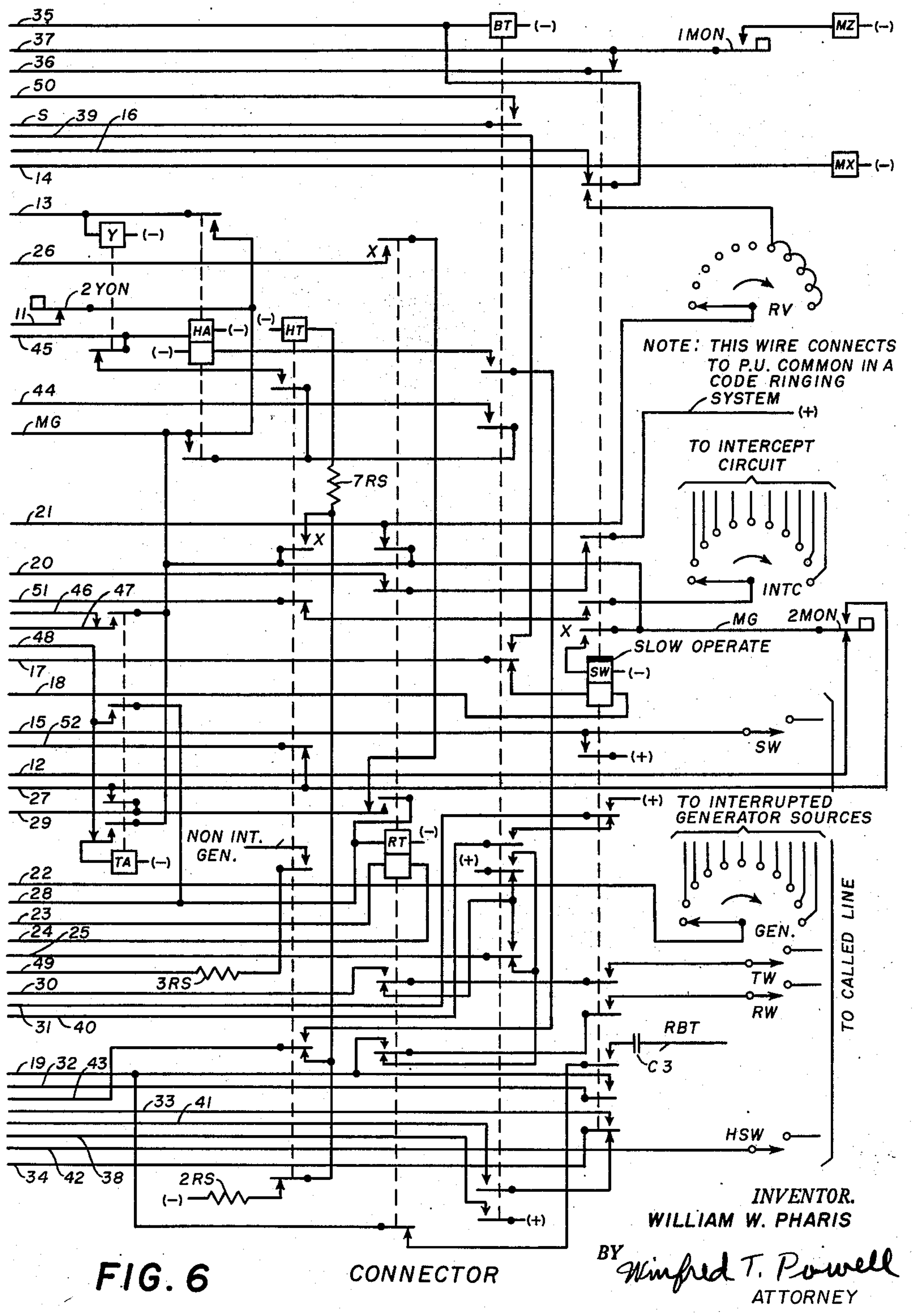

When the tens digit is dialled, the CB relay follows the impulses of this digit for flashing the monitor lamp, for locking relay XD until the end of the tens digit and for stepping the switch in its primary or X direction, all in the previously described manner. In this case, however, the HS lead incoming to the connector is switched from (+) to (—) during the dialling of each digit, this switching operation being effected in the repeater circuit in a manner which is clearly explained in the above mentioned Pharis copending application. When conductor HS is switched from (+) to (—), relay TL of Fig. 5 is operated because its upper winding is energized over the HS conductor. At the end of the tens digit the HS conductor is switched back to (+) for effecting the release of the TL relay. This operation of the TL relay performs no function at this time. When the units digit is dialled, relay CB again responds to the impulses of this digit for flashing lamp MON, for locking relay YD in its operated position until the end of this digit and for operating the secondary or Y magnet of the switch. Relay TL is again operated but performs no function at this time.

When the station digit is dialled, relay CB responds to the impulses of this digit for flashing lamp MON, for locking relay PH and for operating magnet MX of the minor switch, all in the previously described manner. At this digit, relay TL is again operated and at this time it closes a circuit for operating relay TA which may be traced from (+) on conductor MG, minor switch off normal contact 2MON, conductor 27, make contact of relay TL, conductor 46, break contact of relay TA, conductor 47, make contact of relay PD, conductor 48, break contact and winding of relay TA to (−). Relay TA closes a locking circuit for itself extending from (+) on conductor MG, make contact and winding of relay TA to (−). A second locking circuit for relay PD is now closed which may be traced from (+) on conductor MG, make contact of relay PD, make contact of relay TL and lower winding of relay PD to (−). Relay RT is now operated over a circuit extending from (+) on conductor MG, make contact of relay TA, conductor 47, make contact of relay PD, conductor 48, make contact of relay TA and upper winding of relay RT to (−). When relay TL releases to mark the end of the station digit, the above described second locking circuit for relay PD is opened for effecting the release of this relay which in turn opens up and releases relay PH. When relay PH releases, the above described circuits are closed for operating and locking relay SW.

In the event that this is a call to a local line (not a P. B. X line), relay RT remains operated until the operator effects the ringing control operation. This operation is accomplished by switching conductor HS in the repeater from (+) to (−) in response to the operation of the ringing key. This circuit operation is not shown in the present disclosure but is described in the above mentioned Pharis copending application. This switch from (+) to (−) on conductor HS again operates relay TL for opening up the locking circuit for the RT relay, thus effecting the release of this latter relay. This RT relay locking circuit was completed by the release of relay TL following the end of the station digit and may be traced from (+) on conductor MG, minor switch off normal contact 2MON, conductor 27, break contact of relay TL, conductor 29, make contact and upper winding of relay RT to (−). The release of relay RT, in response to the operation of relay TL when the operator rings, effects the application of automatic ringing current to the called line. This ringing circuit may be traced from the selected source of the interrupted generator, minor switch wiper GEN, conductor 22, make contact of relay XD (operated in response to the operation of relay SW over the previously described circuit), conductor 23, lower winding of relay RT, conductor 24, break contact of relay TL, conductor 25, break contact of relay BT, break contact of relay RT, make contact of relay SW, wiper RW and associated terminal, over the called line and substation circuits in series, terminal and wiper TW, make contact of relay SW, break contact of relay RT and break contact of relay BT to (+). It will be obvious that this application of the ringing current to the called line will be reversed, as previously described, if the station digit is any number from 6 to 0, because relay BT will then be operated. When the call is answered, relay RT is operated and locked in the previously described manner. If the called party hangs up on a connection of this type, the operator can re-ring by effecting the operation of the TL relay in the previously described manner for opening up and releasing relay RT which resets the ringing circuit.

In the event that this is a call to a P. B. X line, relay HT is operated and locked when relay PD releases and before relay PH releases, following the station digit, over a circuit which may be traced from (+) on the terminal to which wiper HSW is connected (the terminal associated with the first line of a P. B. X group being connected permanently to (+)), wiper HSW, conductor 42, break contact of relay PD, make contact of relay PH, conductor 43, break contact of relay HT, resistor 1RS and winding of relay HT to (−). Relay HT closes a locking circuit for itself extending from (+) on conductor MG, X make contact of relay HT, resistor 1RS and winding of relay HT to (−).

Now when the operator rings on this connection, relay TL is operated for releasing relay RT, thus closing a circuit for ringing on the called line, this circuit being traced from the source of the non-interrupted generator, make contact of relay HT, resistor 3RS, conductor 49, make contact of relay TL, conductor 25, break contact of relay BT, break contact of relay RT, make contact of relay SW, wiper RW and associated terminal, called line and substation circuits in series, terminal and wiper TW, make contact of relay SW, break contact of relay RT and break contact of relay BT to (+). It will thus be seen that the operator can control the application of this ringing current to the called line in accordance with the ringing key operation. In other words, this circuit does not set the ringing circuit of the connector for applying interrupted generator to the called line but it controls the application of non-interrupted generator to the called line each time the ringing key is operated. When the call is answered, with relay HT operated, relay RT is operated over a circuit which may be traced from (+), break contact of relay BT, break contact of relay RT, make contact of relay SW, wiper TW and associated terminal, called line and substation circuits in series, terminal and wiper RW, make contact of relay SW, break contact of relay RT, break contact of relay BT, conductor 25, break contact of relay TL, conductor 24, lower winding of relay RT, conductor 23, break contact of relay XD and make contact of relay RD to (−). Relay RT locks operated over the previously described circuit. In the event that the called line extends to a P. B. X trunk line to which a closed loop is connected, the operator can ring on this closed loop. This is because, even though relays AB and AA are operated because the connection is extended to a closed loop circuit, relay TL can be operated when the HS conductor is switched from (+) to (−), since this switch in potential short circuits the upper winding of the TL relay for causing it to operate by way of its lower winding over a circuit extending from (+), lower winding of relay TL, make contact of relay AA and make contact of relay RD to (−). With conductor HS normally connected to (+)

(no ringing operation effected) relay TL is not operated because the circuit through both of its windings to (−) at the lowermost make contact of relay RD energizes these windings in opposition, as indicated by the arrows, and since this is a differential relay it will not operate under this condition. This operation of relay TL in connection with a closed called loop effects the release of relay RT and the application of the non-interrupted generator current to the called line in the previously described manner.

In connection with a toll call through the connector, the answering, the talking and the release operations function in the previously described manner, with relays TA and HT being released when relay RD is released for deenergizing conductor MG. In connection with this circuit operation for permitting the distant toll operator to cause the connector to ring into a closed loop circuit associated with the called line, this closed loop circuit may be a cord circuit in the P. B. X connected to the incoming line circuit and the distant operator may wish to ring into the closed loop provided by the cord circuit to signal the P. B. X operator in the event that the called local station in the P. B. X has hung up the receiver. It will be understood that the loop circuit to the P. B. X is not closed when there is no plug in the jack associated with this line. This permits the release of the AB and AA relays when the operator at the P. B. X takes down the connection, thus (+) is removed from conductor MG for effecting the release of the connector and its associated circuits.

While there is no provision illustrated in the repeater on the tandem office end of the toll office-tandem office trunk circuit for responding to alternating ringing current to condition the HS conductor for setting the ringing circuit in the connectors, it will be obvious that an alternating current relay in series with a condenser, may be connected across the toll line conductors for conditioning the control conductor HS for setting the ringing condition in the connector as previously explained. In this particular showing, the ringing condition is set up by dialling an extra or station digit after the units digit is dialled. Since relay TL of the connector is operated on a toll call, conductor 25 extending to one side of the called line is switched from conductor 24, extending to the ringing generator source by way of conductors 23 and 22 and conductor 25 is connected to conductor 49 which extends to the non-interrupted generator by way of a make contact of the HT relay. The detailed circuit operation of the ringing control in the connector, when relay TL is operated has already been explained.

This invention is not limited in its application to the particular system described herein, since it may be applied to any system in which the described features are desirable.

What is claimed is:

1. In a telephone system, a calling line; a called line; a repeater; an interoffice trunk connected to said repeater; a toll operator's position accessible to said trunk; said repeater having first and second impulse receiving relays, a tone control relay, and a pair of interdependent impulse sending relays; means for extending a connection from said calling line to said repeater; means effective upon the seizure of said repeater by way of said connection on a toll call for utilizing said first impulse receiving relay and said tone control relay for causing the impulse sending relays to extend said connection automatically from said repeater to said toll operator's position by way of said trunk; means effective upon the seizure of said repeater on a local call to said called line for utilizing said second impulse receiving relay to operate said impulse sending relays; and means responsive to the receipt of impulses transmitted thereafter from said calling line for causing said second impulse receiving relay to operate said impulse sending relays for repeating said transmitted impulses over said trunk line.

2. In a telephone system, a first office, a second office, an interoffice trunk connecting said offices, subscriber dial station lines in each said office, selective switching apparatus at each said office accessible from and responsive to dial control at said subscriber lines, selective switching apparatus at each said office accessible from said trunk, different paths of access to said trunk selectable by said selective switching apparatus in said first office, means responsive to the seizure of said trunk over a given one of said different paths of access for automatically and directively controlling said selective switching apparatus at said second office accessible from said trunk and means responsive to the seizure of said trunk over a different one of said different paths of access for rendering said selective switching apparatus accessible from said trunk at said second office directively responsive to substation dial control over said trunk.

3. In a telephone system, a first office, a second office, an interoffice trunk connecting said offices having means for reversing the direction of current flow thereover, subscriber dial station lines in each said office, selective switching apparatus at each said office accessible from and responsive to dial control at said subscriber lines, selective switching apparatus at each said office accessible from said trunk, different paths of access to said trunk selectable by said selective switching apparatus in said first office, means responsive to the seizure of said trunk over a given one of said different paths of access for automatically and directively controlling said selective switching apparatus at said second office accessible from said trunk and means responsive to the seizure of said trunk over a different one of said different paths of access for enabling said trunk reversing means and for rendering said selective switching apparatus at said second office accessible from said trunk directively responsive to substation dial control over said trunk.

4. In a telephone system, subscriber lines, a trunk line having a terminating repeater at one end thereof accessible to said subscriber lines, an operator's position accessible to the distant end of said trunk line and having means for signaling an operator's response to the seizure thereof by said trunk line, a tone circuit connectable to said trunk line to indicate to an operator at said position that a subscriber line of a particular class is connected to said terminating repeater, a tone control relay in said repeater, an impulse generating relay in said repeater, means responsive to the seizure of said repeater by one of said lines for operating said tone control relay, means including the operation of said tone control relay for operating said impulse generating relay, means including said impulse generating relay for transmitting an impulse over said trunk line, means responsive to said impulse for extending a connection to said operator's position, and means including said tone control relay responsive to a signal from said distant end of said trunk transmitted by said signal means to indicate the response of an operator for connecting said tone circuit to said trunk line.

5. In a telephone system, subscriber lines, a trunk line having a terminating repeater at one end thereof accessible to said subscriber lines, an operator's position accessible to the distant end of said trunk line and having means for signaling an operator's response to the seizure thereof by said trunk line, a tone circuit connectable to said trunk to indicate to an operator at said position that a subscriber line of a particular class is connected to said terminating repeater, a plurality of tone control relays in said repeater, a plurality of impulse generating relays in said repeater, means responsive to the seizure of said repeater by one of said lines for operating said tone control relays, means including the operation of said tone control relays for operating said impulse generating relays, means including said impulse generating relays for transmitting an impulse over said trunk line, means responsive to said impulse for extending a connection to said operator's position, and means including said tone control relays responsive to a signal from said distant end of said trunk transmitted by said signal means to indicate the response of an operator for momentarily connecting said tone circuit to said trunk line.

6. In a telephone system, a connector switch employed in completing both toll and local calls, line conductors, a holding conductor and a control conductor incoming to said connector switch, a repeater extendible to said connector over said incoming conductors, a source of current means normally connecting one polarity of said source of current to said control conductor, means for switching said control conductor from said one polarity to the opposite polarity of said source, means responsive to said change in polarity for conditioning said connector for toll operation, a called subscriber's station accessible to said connector, said station having means for transmitting off hook and on hook signals to said connector, and means in said connector responsive to said off hook and on hook signals for transmitting off hook and on hook signals over said control conductor.

7. In a telephone system, a connector switch employed in completing both toll and local calls, local selectors each having line and holding connections and having access to said connector over said line and holding connections, incoming selectors each having line, holding and control connections and having access to said connector over said line, holding and control connections, a repeater permanently connected to each said incoming selector, a source of current, means normally connecting one polarity of said source of current to said control conductor, means in said repeater for switching said control conductor from said one polarity to the opposite polarity of said source, means responsive to said change in polarity for conditioning said connector for toll operation, a called subscriber's station accessible to said connector, said station having means for transmitting off hook and on hook signals to said connector, and means in said connector responsive to said off hook and on hook signals for transmitting off hook and on hook signals over said control conductor.

8. In a telephone system, a connector switch employed in completing both toll and local calls, line conductors, a holding conductor and a control conductor incoming to said connector switch, a repeater extendible to said connector over said incoming conductors, a source of current, means in said repeater normally connecting one polarity of said source of current to said control conductor, means in said repeater for switching said control conductor from said one polarity to the opposite polarity of said source, means in said connector responsive to said change in polarity for conditioning said connector for toll operation, means in said connector normally connecting one polarity of said source of current to said control conductor, means in said connector for switching said control conductor from said one polarity to the opposite polarity of said source, means in said repeater responsive to said change in polarity for transmitting supervisory signals, a called subscriber's station accessible to said connector, said station having means for transmitting supervisory signals to said connector and means in said connector responsive to said supervisory signals for operating said polarity changing means for operating said means in said repeater for transmitting supervisory signals.

9. In a telephone system, a connector switch employed in completing both toll and local calls, line conductors, a holding conductor and a control conductor incoming to said connector switch, a repeater extendible to said connector over said incoming conductors, a called subscriber's station accessible to said connector, said station having means for transmitting supervisory signals to said connector, a toll operator's position, means at said toll operator's position for extending a connection to said repeater including line conductors whereby an operator thereat may reach said called subscriber's station by way of a connection including said repeater and said connector, means in said repeater for transmitting supervisory signals to said operator's position by reversing current flow in said line conductors, a source of current, means in said connector normally connecting one polarity of said source of current to said control conductor, means in said connector for switching said control conductor from said one polarity to the opposite polarity of said source, said switching means in said connector being responsive to said called station supervisory signal transmitting means and said means in said repeater for transmitting line current reversal supervisory signals to said operator's position being under control of said control conductor and responsive to said polarity reversal means in said connector.

10. In a telephone system, a connector switch employed in completing both toll and local calls, local selectors each having line and holding connections and having access to said connector over said line and holding connections, incoming selectors each having line, holding and control connections and having access to said connector over said line, holding and control connections, a repeater permanently connected to each said incoming selector, a toll operator's position, means at said toll operator's position for extending a connection to said repeater including line conductors, subscriber's stations each having means for transmitting supervisory signals, said stations having access to said local selectors and being accessible to said connector, a source of current, means in said connector responsive to supervisory signals transmitted to said connector by a called station for reversing current flow in said line connections between a local selector and said connector, means in said repeater normally connecting one polarity of said source of current to said control conductor, means in said repeater for switching said control conductor from said one polarity to the opposite polarity of said source, means in said connector responsive to said change in polarity for conditioning said connector for toll operation, means in said connector normally connecting one polarity of said source of current to said control conductor, means in said connector for switching said control conductor from said one polarity to the opposite polarity of said source, means in said repeater responsive to said change in polarity for reversing current flow in said line conductors between said repeater and said toll operator's position, and means responsive to supervisory signals transmitted from a called subscriber's station for controlling said means in said connector for switching said control conductor from one polarity of said source of current to the other.

11. In a telephone system, a connector switch employed in completing both local and toll calls, local selectors each having line and holding connections and having access to said connector over said line and holding connections, incoming selectors each having line, holding and control connections and having access to said connector over said line, holding and control connections, a repeater permanently connected to each said incoming selector, a toll operator's position, means at said toll operator's position for extending a connection to said repeater, subscriber's stations having access to said local selectors and being accessible to said connector, and a differential duplex circuit established from a said repeater, through a said incoming selector into said connector, said circuit including a differentially wound relay in said repeater having one winding thereof connected to said control connection, a differentially wound relay in said connector having one winding thereof connected to said extended control connection, means in said repeater for making a connection to said circuit for causing the operation of said relay in said connector but not said relay in said repeater, means in said connector for making a connection to said circuit for causing the operation of said relay in said repeater but not said relay in said connector, supervisory circuits in said repeater under control of said relay thereat, and circuits for adapting said connector to toll working under control of said relay thereat.

12. In a telephone system, a connector switch employed in completing both local and toll calls, local selectors each having line and holding connections and having access to said connector over said line and holding connections, incoming selectors each having line, holding and control connections and having access to said connector over said line, holding and control connections, a repeater permanently connected to each said incoming selector, a toll operator's position, means at said toll operator's position including dialing means for extending a connection to said repeater, thence to said incoming switch, thence to said connector and thence to a called subscriber's station, subscriber's stations each having dialing means, a differential duplex circuit established from a said repeater, through a said incoming selector into said connector, said circuit including a differentially wound relay in said repeater having one winding thereof connected to said control connection, a differentially wound relay in said connector having one winding thereof connected to said extended control connection, means in said repeater for making a connection to said circuit for causing the operation of said relay in said connector but not said relay in said repeater, means in said connector for making a connection to said circuit for causing the operation of said relay in said repeater but not said relay in said connector, means in said repeater for transmitting dial pulses from said operator's position for setting said connector over said differential duplex circuit to operate said differentially wound relay in said connector and means controlled by the operation of said relay for conditioning said connector for toll working.

13. In a telephone system, a connector switch employed in completing both local and toll calls, local selectors each having line and holding connections and having access to said connector over said line and holding connections, incoming selectors each having line, holding and control connections and having access to said connector over said line, holding and control connections, a repeater permanently connected to each said incoming selector, a toll operator's position, means at said toll operator's position, including dialing means, for extending a connection to said repeater thence to said incoming selector, thence to said connector and thence to a called subscriber's line, supervisory means at said toll operator's position, subscriber's stations each having dialing means for operating said local selectors and said connector and means for transmitting supervisory signals, a differential duplex circuit established from a said repeater through a said incoming selector into said connector, said circuit including a differentially wound relay in said repeater having one winding thereof connected to said control connection, a differentially wound relay in said connector having one winding thereof connected to said extended control connection, means in said repeater for making a connection to said circuit for causing the operation of said relay in said connector but not said relay in said repeater, means in said connector for making a connection to said circuit for causing the operation of said relay in said repeater but not said relay in said connector, said connection making means in said repeater being responsive to said dialing means in said operator's position, said connection making means in said connector being responsive to supervisory signals transmitted from a called subscriber's station, said relay in said connector controlling means for adapting said connector to toll working and said relay in said repeater controlling said supervisory means at said operator's position.

14. In a telephone system, a connector switch employed in completing both local and toll calls, local selectors each having line and holding connections and having access to said connector over said line and holding connections, incoming selectors each having line, holding and control connections and having access to said connector over said line, holding and control connections, a repeater permanently connected to each said incoming selector, a toll operator's position, a line from said toll operator's position to each said repeater, means at said toll operator's position including dialing means for extending a connection over one of said lines to one of said repeaters, thence to one of said incoming selectors, thence to said connector and thence to a called subscriber's line, supervisory means at said toll operator's position responsive to a reversal of said line leading to one of said repeaters, subscriber's stations each having dialing means for operating said local selectors and said connector and having means for transmitting supervisory signals, a differential duplex circuit established from a said repeater through a said incoming selector into said connector, said circuit including a differentially wound relay in said repeater having one winding thereof connected to said control connection, a differentially wound relay in said connector having one winding thereof connected to said extended control connection, means in said repeater for making a connection to said circuit for causing the operation of said relay in said connector but not said relay in said repeater, means in said connector for making a connection to said circuit for causing the operation of said relay in said repeater but not said relay in said connector, said connection making means in said repeater being responsive to said dialing means in said operator's position, said connection making means in said connector being responsive to supervisory signals transmitted from a called subscriber's station, said relay in said connector controlling means for adapting said connector to toll working and said relay in said repeater operating to cause line reversal in said line from said toll operator's position to said repeater.

References Cited in the file of this patent

UNITED STATES PATENTS

| Number | Name | Date |
|---|---|---|
| 1,605,734 | Homrighous | Nov. 2, 1926 |
| 1,747,405 | Von Beckerath | Feb. 18, 1930 |
| 1,990,644 | Friendly | Feb. 12, 1935 |
| 2,061,802 | Kroll | Nov. 24, 1936 |
| 2,147,235 | Beale | Feb. 14, 1939 |